United States Patent
De Lury et al.

(10) Patent No.: US 7,533,081 B2
(45) Date of Patent: May 12, 2009

(54) SYSTEMS, METHODS AND APPARATUS TO DETERMINE RELEVANCE OF SEARCH RESULTS IN WHOLE/PART SEARCH

(75) Inventors: Barbara De Lury, Marina Del Ray, CA (US); Adam Lilling, Santa Monica, CA (US)

(73) Assignee: General Electric Company, Schenectady, NY (US)

(*) Notice: Subject to any disclaimer, the term of this patent is extended or adjusted under 35 U.S.C. 154(b) by 459 days.

(21) Appl. No.: 10/914,770

(22) Filed: Aug. 9, 2004

(65) Prior Publication Data

US 2005/0187915 A1   Aug. 25, 2005

Related U.S. Application Data

(63) Continuation-in-part of application No. 10/888,870, filed on Jul. 10, 2004.

(60) Provisional application No. 60/542,746, filed on Feb. 6, 2004.

(51) Int. Cl.
G06F 17/30 (2006.01)

(52) U.S. Cl. ................................ 707/3; 707/4; 714/1
(58) Field of Classification Search ................. 707/3, 707/4; 714/1
See application file for complete search history.

(56) References Cited

U.S. PATENT DOCUMENTS

| | | | |
|---|---|---|---|
| 6,321,228 B1* | 11/2001 | Crandall et al. | 707/10 |
| 2002/0107849 A1* | 8/2002 | Hickey et al. | 707/3 |
| 2004/0044622 A1* | 3/2004 | Blott et al. | 705/40 |
| 2004/0255179 A1* | 12/2004 | Mayer | 714/1 |
| 2006/0047649 A1* | 3/2006 | Liang | 707/4 |

* cited by examiner

*Primary Examiner*—Charles Rones
*Assistant Examiner*—Fariborz Khoshnoodi
(74) *Attorney, Agent, or Firm*—Michael G. Smith, Esq.; Ellis B. Ramirez, Esq.

(57) ABSTRACT

Systems, methods and apparatus are provided through which, in one aspect, one or more wholes and parts of wholes are searched in a database, presented to a user, sold and/or distributed.

15 Claims, 21 Drawing Sheets

SYSTEMS, METHODS AND APPARATUS TO DETERMINE RELEVANCE OF SEARCH RESULTS IN WHOLE/PART SEARCH

RELATED APPLICATION

This application claims the benefit of U.S. Provisional Application Ser. No. 60/542,746 filed Feb. 6, 2004 under 35 U.S.C. 119(e).

This application is a continuation in part of copending U.S. application Ser. No. 10/888,870 filed Jul. 10, 2004 entitled "Systems, Methods and Apparatus of a Whole/Part Search Engine."

FIELD OF THE INVENTION

This invention relates generally to searching and distributing data over a network, and more particularly to searching and distributing digital products over the Internet.

BACKGROUND OF THE INVENTION

Simple, intuitive and accurate tools for locating products online are a fundamental requirement for e-commerce on the World Wide Web (WWW). For e-commerce to be successful, the experience of using an e-tailer's digital storefront must compete with the simplicity of walking into a brick and mortar store and being directed to a physical product on a shelf This requirement is most apparent in shopping experiences in which a high degree of "browsing" or looking for products with similar features occurs. In such instances, the ability to bring back targeted results quickly without having to learn complex interaction sequences is critical to the success of the online storefront.

The challenges of providing simple, accurate search tools apply beyond e-commerce and product searches to all searches of "digital catalogs." Digital catalogs on the WWW hold all types of digital products and items. Examples include news articles, music, movies, software, books, and white papers. A unique characteristic of digital products is that they lend themselves to flexible "packaging:" digital products can be distilled down to component parts that are individually distributable, or can include a number of component parts grouped together. Another significant characteristic of digital products or items is that they often have physical counterparts. A collection or aggregation of songs may directly correlate to a physical album. A collection or aggregation of articles may correlate to an issue of a magazine.

The rapid evolution of requirements for searching digital catalogs is perhaps best illustrated in the growth of online digital music distribution. Music has been sold online since the early 90s. Until recently, however, music has only been available for sale online in its "physical," shrink-wrapped form, embodied in a compact disc, cassette, or vinyl record.

Early music search engines developed to sell music CDs online managed relatively small catalogs, often with less than a few hundred thousand products, representing all available popular and classical music. These search engines were implemented somewhat simply, relying on standard relational database technology to hold descriptive information about products, and to perform simple SQL-based search queries on individual fields of information. These search engines were limited in function, performance and flexibility.

A fundamental shift in the size and complexity requirements of music search technology came about after the Music Industry joined the supply chain of digital music, and the first legitimate services or "storefronts" for the online sale and digital distribution of music as individual tracks appeared. Although digital music files had been widely available on the web prior to this time, the content was unlicensed and the early aggregators and distributors were violating copyright laws. Consequently, there was no significant investment in improving the user's experience and success rate of locating digital music files. The major record label's participation in licensing and providing digital content to digital service providers and e-tailers laid the groundwork for a new, online marketplace centered around the sale and distribution of a purely digital product.

Digital music is now widely distributed through legitimate channels as downloads, streams, webcasts and even ringtones. In the search technology used by the distributors, the need to locate "albums" and shrink-wrapped products is replaced by the need to locate individual recordings, or tracks of albums. This represents a significant shift in both the number of products that must be managed within digital music catalogs, and the complexity of the catalogs that now have to support products or songs that are included in many different albums. Nevertheless, there are many service providers, portal providers, and retailers, including traditional record stores and online 'physical product' retailers, that have a need to distribute digital music over the Internet.

Companies such as Endeca Technologies Inc. of Cambridge, Mass., and Mercado Software USA of Palo Alto, Calif., offer products capable of indexing data from relational databases and other sources and supporting search and navigation access to that data Both of these companies have created search engines that index data from relational databases, XML files, and file systems. These systems effectively apply indexing techniques that scale to meet large catalog needs, and through indexing enable simple, single-field, "free text" searches. However, such conventional implementations are ultimately limited in the accuracy they can provide through simple search interfaces. They do not capture the interrelationships of the items that are being searched, and therefore often miss the actual result being sought. As an example, consider a user looking for albums that contain both of the Beatles songs "Help" and "Yesterday." Conventional album searches may locate albums that contain the two songs, but conventional download searches will fail to bring back any result that does not contain both of the words "help" and "yesterday" in a single song's attributes. Even in conventional album searches, the inability to recognize the input as two distinct popular song titles will result in poor relevance ordering of the results.

Other conventional implementations within the realm of search technology, suffer from additional limitations. Such limitations include requiring multiple search fields in which a user must identify the type of attribute to search within (e.g. must select 'artist' to search on an artist's name). The limitations make it difficult to search using different attribute types. In addition, much of the available data is not available as search criteria or for display in the results of a search.

For the reasons stated above, and for other reasons stated below which will become apparent to those skilled in the art upon reading and understanding the present specification, there is a need in the art for locating and distributing one or more products that can be distributed individually. There is also a need for more complete searches, results that fit the search criteria, and coherent ordering of search results. In addition, there is a need to not require multiple search fields and to make available data that is available as search criteria or for display in the results of a search.

BRIEF DESCRIPTION OF THE INVENTION

The above-mentioned shortcomings, disadvantages and problems are addressed herein, which will be understood by reading and studying the following specification.

In some aspects, a highly scaleable, large catalog, product search engine combines web-based search technologies that includes the use of indexes for quick response and use of a relevance engine to order results with product-oriented database technologies that includes storage of product data with associated categories of attributes and product/sub-product relationships to provide a fast and accurate search from within a single text field.

In other aspects, the search engine is implemented with products available for individual sale that have a whole/part (i.e. product/sub-product) relationship with other products also available for individual sale.

In yet another aspect, a search engine provides information on both "physical" music product and "digital" music products simultaneously, using a single search of an integrated index to bring back the most relevant possible matches to a user's query regardless of type of music product.

A relevance score is determined for each potential hit within search processing. The relevance score takes into consideration several different factors. Simply, a conventional relevance score is computed based on the assigned weight of an attribute type and the quality of the match based on an analysis of the words entered by the user and how and where they appear in the product or sub-product attributes.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, system level overviews are described. In the second section, methods of embodiments are described. In the third section, particular implementations are described. In the fourth section, the hardware and the operating environment in conjunction with which embodiments may be practiced are described. Finally, in the fifth section, a conclusion of the detailed description is provided.

System Level Overviews

Figure 1:
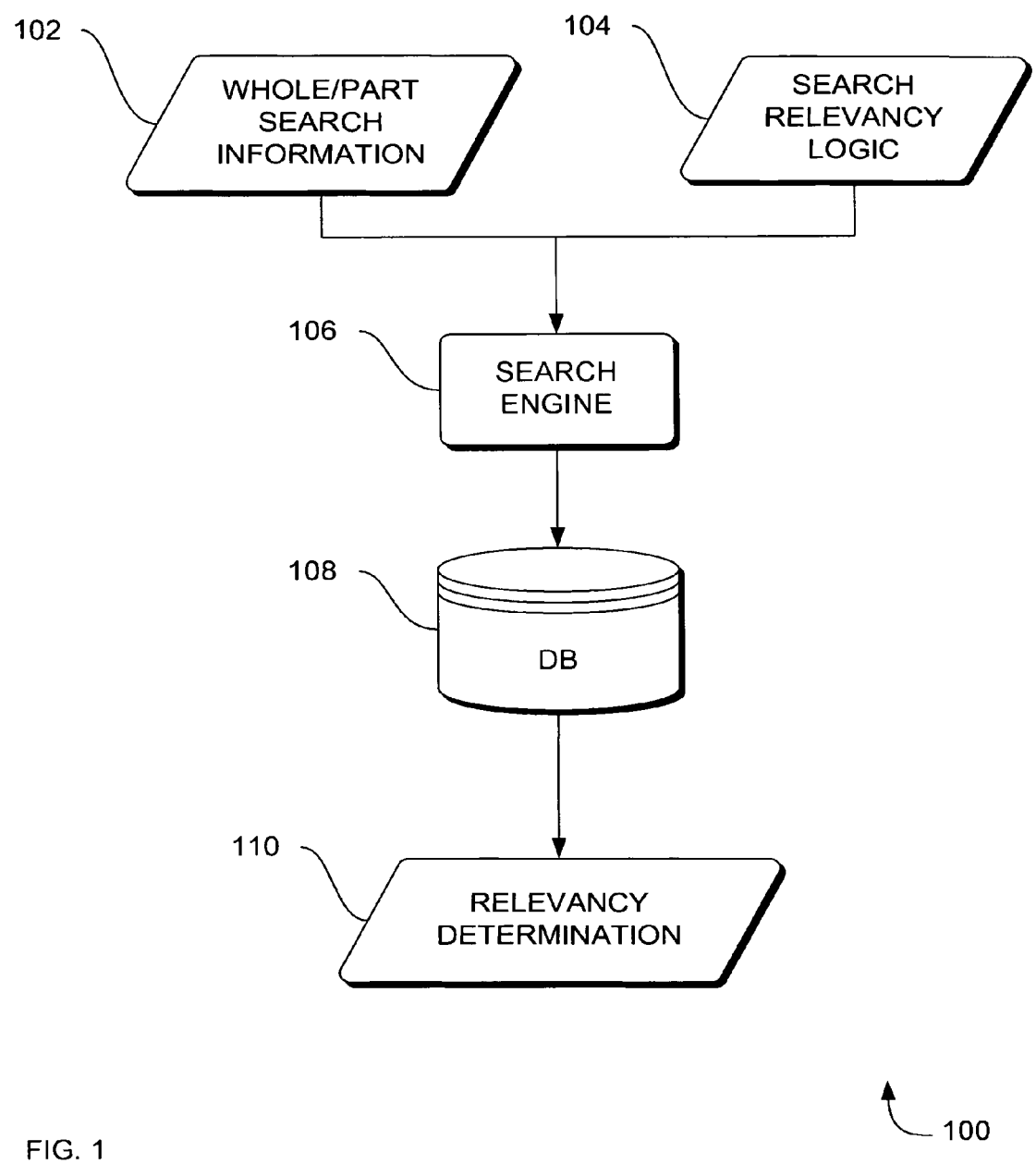
FIG. 1 is a flowchart that provides a system level overview of an embodiment of a server method.

FIG. 1 is a block diagram that provides a system level overview of an embodiment that performs relevancy analysis. Embodiments are described as operating in a multi-processing, multi-threaded operating environment on a computer, such as computer 2102 in FIG. 21. System 100 fulfills the need in the art for more complete searches, results that fit the search criteria, and coherent ordering of the search results.

System 100 includes a search formation for a whole and/or a part 102 and search relevancy logic 104 that is received by a search engine 106. A part is a portion of a whole. Another term for whole and part is set and subset, respectively. The search engine 106 searches for the whole/part information in a database 108 using the search relevancy logic 104. The result of the search by the search engine 106 includes a relevancy determination 110 that describes the relevancy of the retrieved wholes and/or portions.

The integration of the search relevancy logic 104 in the search by the search engine 106 in system 100 provides more complete searches for wholes and portions, provides search results that fit the search criteria of the wholes and portions, and provides coherent ordering of the search results based on the relevancy of the wholes and portions. System 100 also satisfies the need in the art for locating one or more parts of wholes that can be distributed individually.

In some embodiments, the search relevancy logic 104 is a shared library such as a stored procedure or a dynamic link library (DLL) that is external to the search engine 106, but accessed by the search engine 106. In other embodiments, the search relevancy logic 104 is internally integrated into the search engine 106 as a whole by compiling source code for the search relevancy logic 104 with source code for the search engine 106.

Figure 2:
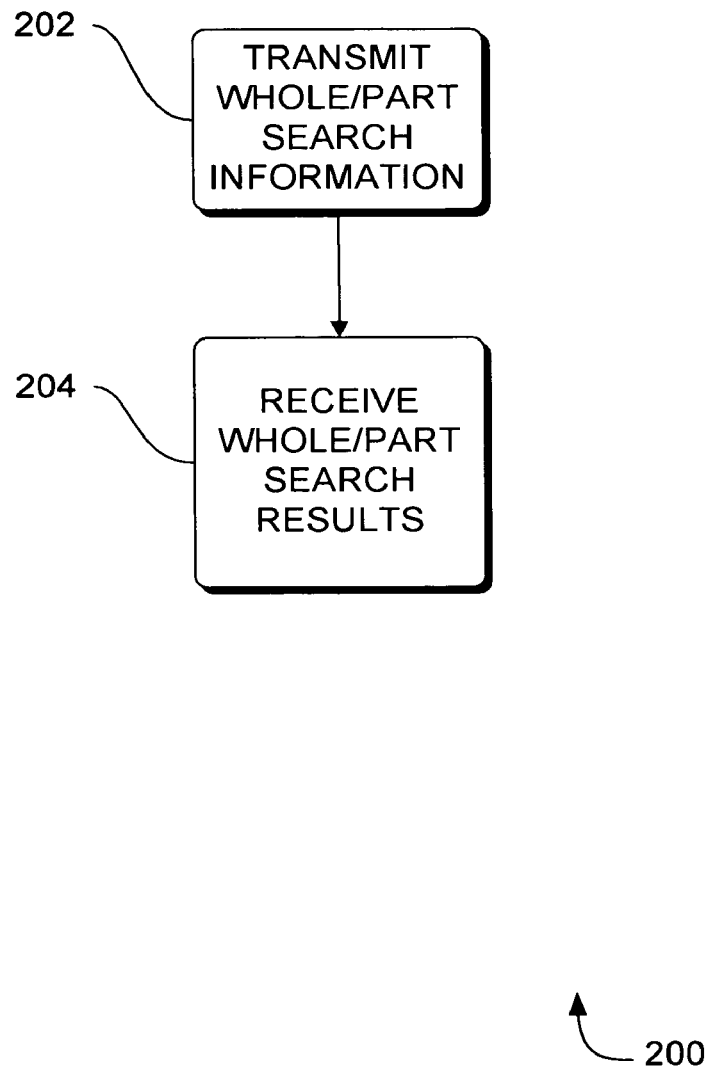
FIG. 2 is a flowchart that provides a system level overview of an embodiment of a client method.

FIG. 2 is a block diagram that provides a system level overview of an embodiment of a method 200 of managing a search. Embodiments are described as operating in a multi-processing, multi-threaded operating environment on a computer, such as computer 2102 in FIG. 21. Method 200 fulfills the need in the art for locating portions of wholes that can be distributed individually.

Method 200 includes transmitting 202 whole/part search information 102. Method 200 also includes receiving 204 whole/part search results. The information is obtained in reference to, associated with, or from, the whole/part search information 102 in FIG. 1. Method 200 fulfills the need in the art for locating one or more portions of wholes that can be distributed individually.

Figure 3:
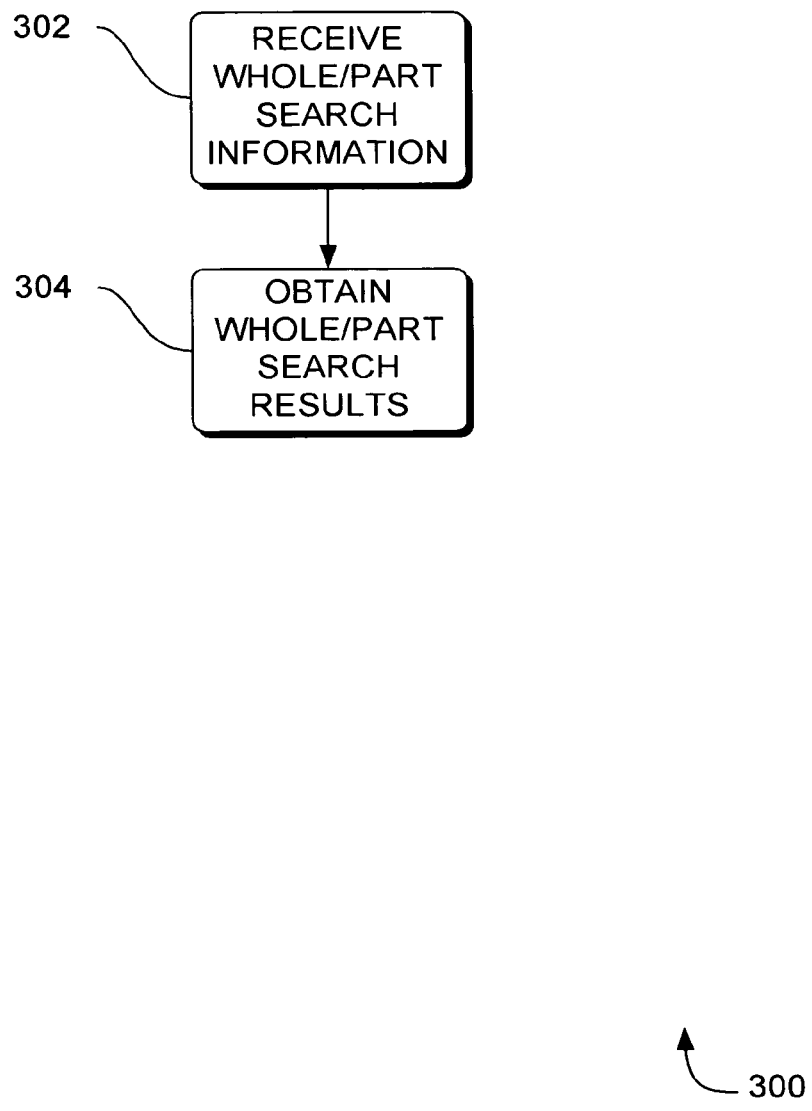
FIG. 3 is a block diagram that provides a system level overview of an embodiment of a server method.

FIG. 3 is a block diagram that provides a system level overview of an embodiment of a server method. Embodiments operate in a multi-processing, multi-threaded operating environment on a computer, such as computer 2102 in FIG. 21. Method 300 fulfills the need in the art for locating portions of wholes that can be distributed individually.

Method 300 includes receiving 302 whole/part search information 102. Method 300 also includes obtaining 304 whole/part search results that include relevancy information 110. In an embodiment where the whole is a product, and the part is distributed separately, method 300 fulfills the need in the art for locating one or more portions of wholes that can be distributed individually.

Figure 4:
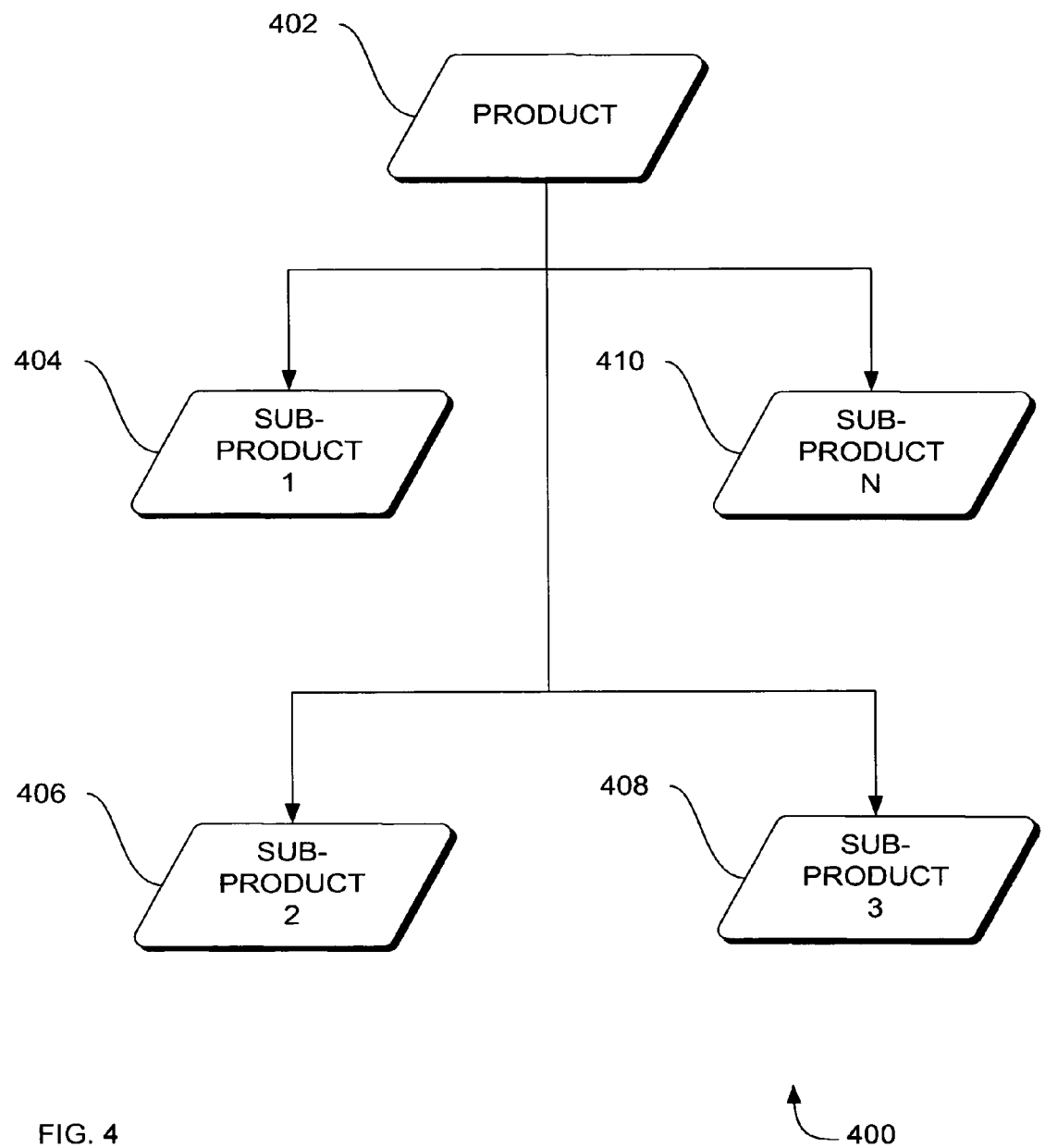
FIG. 4 is a block diagram of an example of a hierarchy of a whole and parts according to an embodiment.

FIG. 4 is a block diagram of an example of a hierarchy 400 of whole and parts according to an embodiment. In this embodiment, a whole comprises a product 402. In addition, the product 402 is further comprised of sub-products 404, 406, 408 and 410. Hierarchy 400 fulfills the need in the art for locating one or more portions of wholes that can be distributed individually.

System level overviews of the operation of embodiments have been described in this section of the detailed description. Portions of wholes associated with a search phrase are identified by a first computer and information describing the portions is received by a second computer. While the methods 100 and 200 are not limited to any particular search phrase, part or whole, for sake of clarity a simplified search phrase, part and whole have been described.

Methods of an Embodiment

In the previous section, a system level overview of the operation of an embodiment was described. In this section, particular methods performed by the server and the clients of such embodiments are described by reference to a series of flowcharts. Describing the methods by reference to a flowchart enables one skilled in the art to develop such programs, firmware, or hardware, including such instructions to carry out the methods on suitable computerized clients and servers, the processor of the clients and servers executing the instructions from computer-readable media. In some embodiments, methods 300, 500, 600, 700, 800, 900 and/or 1000 are performed by a server program executing on, or performed by firmware or hardware that is a part of, a computer, such as computer 2102 in FIG. 21. In some embodiments, method 900 is performed by a client program executing on, or performed by firmware or hardware that is a part of, a computer, such as computer 2102 in FIG. 21.

Figure 5:
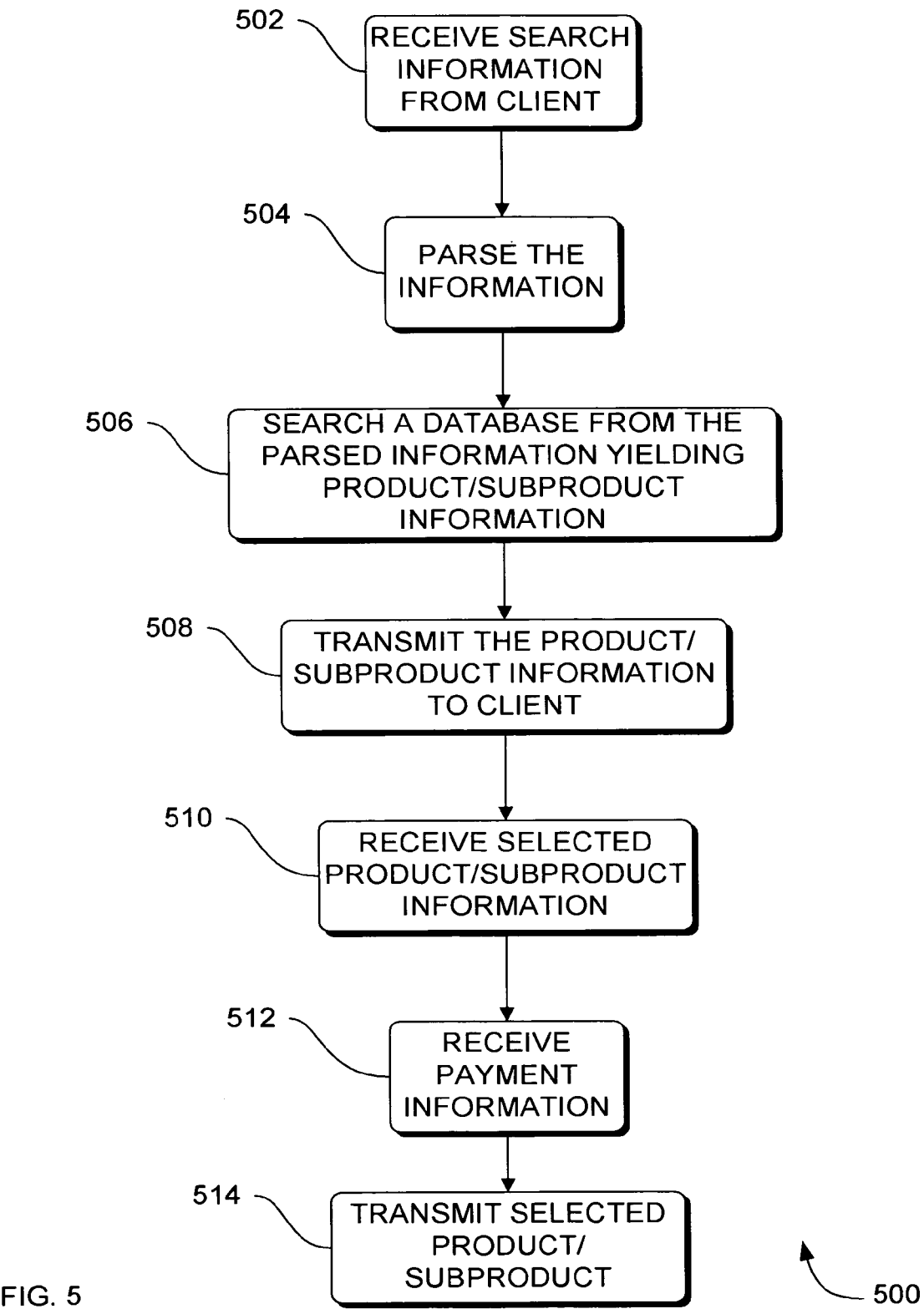
FIG. 5 is a flowchart of a method performed by a server according to an embodiment.

Turning to FIG. 5, a flowchart of a method 500 performed by a server according to an embodiment is presented. Method 500 fulfills the need in the art for locating one or more products that are individually saleable, in terms of product and sub-product hierarchy.

Method 500 includes receiving 502 search information from a client computer through a network, such as the Internet. In some embodiments, the search information is a free-form text query in a single search field which is composed of individual words; the individual words being suitable to be evaluated against product and sub-product attributes. The free form text query includes of any type of descriptive data about the product/sub-product. The search information includes at least one phrase. The at least one phrase may or may not be coherent. There is no requirement that the phrase have any meaning. The phrase is a collection of one or more words that may or may not have meaning. For example, the search information may be composed of "Rocket Man" or "Ode to Joy."

Method 500 also includes parsing 504 the search information to obtain fragments of the search information that are suitable for searching.

Method 500 also includes searching 506 a database for information that describes one or more products, and one or more sub-products. The sub-products are substantially similar to the portions and the products described in FIG. 1. The searching 506 is performed in reference to the parsed search information. The result of the searching 506 is identification, retrieval, and/or location of products and sub-products that satisfy the search criteria of the parsed search information. In this way, method 500 fulfills the need in the art for locating sub-products that can be distributed individually or together as a product.

In some embodiments, obtaining 204 information describing a part of a whole in FIG. 2 includes parsing 504 the search information and searching 506 a database using the parsed search information.

Method 500 also includes transmitting 508 the information that describes the one or more products and the one or more sub-products. In some embodiments, the transmitting 508 is performed through the Internet to a client, such as the client that sent the search string in action 502. Transmitting 508 the product/sub-product information to a client leverages the value of the product/sub-product information that was located in action 506 by sharing and/or distributing the information beyond the computer that located the product/sub-product. The following actions in method 500 exemplify one example of leveraging the product/sub-product information in a sale/purchase of the product and/or the sub-product.

Method 500 further includes receiving 510 information indicating at least one selection of the one or more products and the one or more sub-products. In some embodiments, the receiving 510 is performed through the Internet to a client, such as the client that sent the search string in action 502 or the client that received the product/sub-product information in action 508.

In embodiments where payment is required, method 500 also comprises receiving 512 payment information associated with the one or more selections. Receiving 512 payment can be performed at any time before directing or invoking distribution 514 of the one or more selected products and/or sub-products is performed. In some embodiments, receiving payment 512 and distributing 514 the selected product/sub-products is performed through the Internet with a client. In other embodiments, the receiving 512 and distributing 514 are performed through physical distribution services such as a government postal service or a private package delivery company.

In one particular embodiment of method 500, a computer receives 502 a search string from a client, the computer searches parses 504 the search string, and searches 506 a database for products/sub-products that are described by the parsed search string. The computer transmits 508 the products/sub-products to the client and receives 510 indications of selected products/sub-products from the client. Lastly, the computer receives 512 payment for the selected product/sub-products and distributes 514 the selected product/sub-products to the client.

Figure 6:
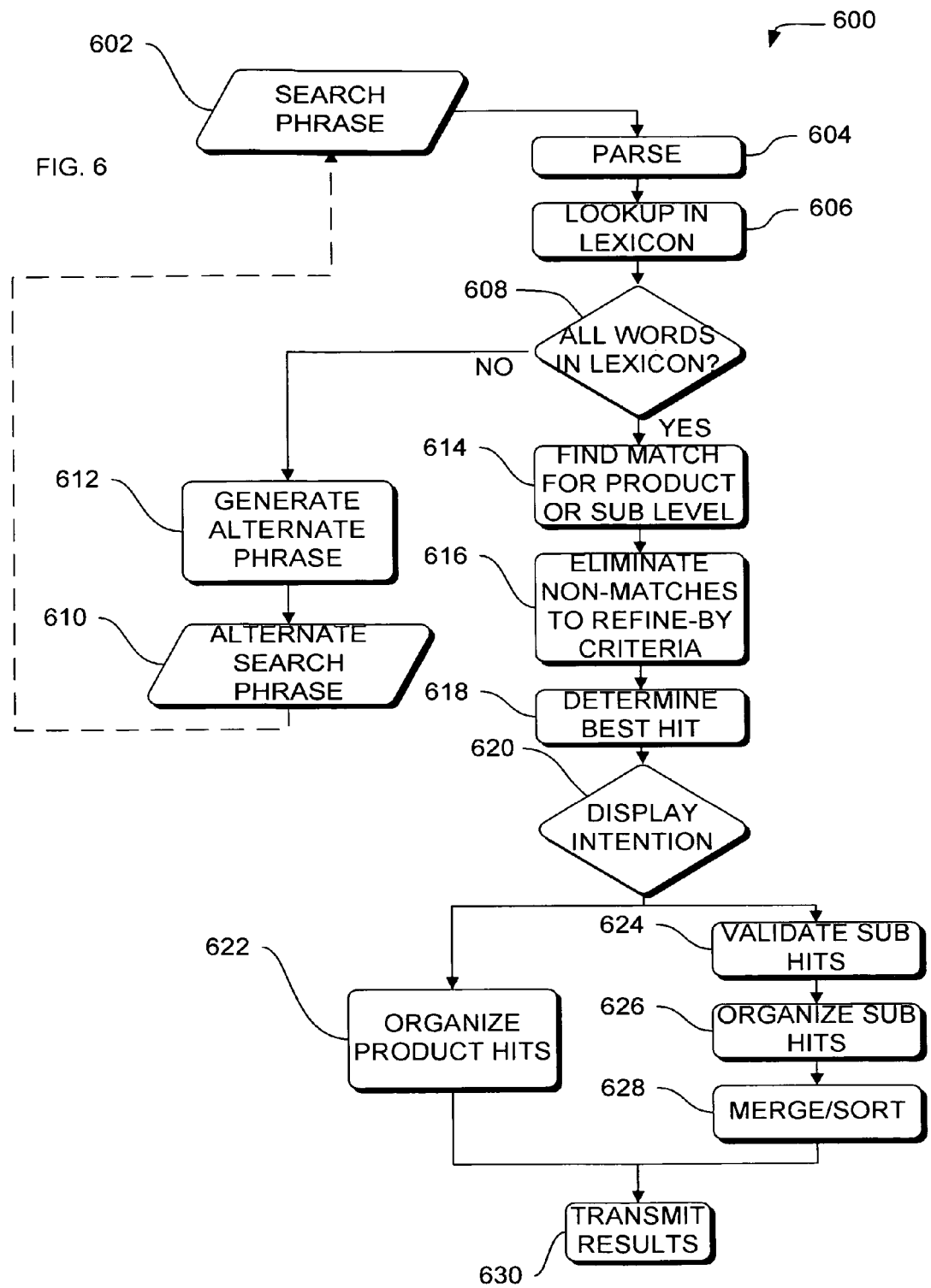
FIG. 6 is a flowchart of a method to locate one or more products that are individually saleable, in terms of product and sub-product hierarchy, performed by a server according to an embodiment.

Turning to FIG. 6, a flowchart of a method 600 performed by a server according to an embodiment is presented. Method 600 fulfills the need in the art for locating one or more products that are individually saleable, in terms of product and sub-product hierarchy. In method 600, a single execution of a search is initiated upon a user entering a search phrase (any number of words) into a single text field on a user interface.

In method 600, a search phrase 602 is parsed 604. In some embodiments, the search phrase 602 is parsed 604 using a set of rules identical to those used in a process of creating a keyword lexicon. Each of the words is then translated into one of the identifiers that match those used in the indexes.

A lexicon is searched 606 for each of the parsed words of the search phrase 602. In some embodiments, if all of the words 608 are not in the lexicon, then an alternate search phrase 610 is generated 612 and presented to the user for conditional confirmation or acceptance to be used as the search phrase 602 for another iteration of method 600. In some embodiments, the alternate search phrase in generated from synonyms and/or corrected spellings of the words, Soundex-like variations, etc. As an alternative to generating and presenting an alternate search phrase, an error message indicating that a word was not found in the lexicon is presented.

In some embodiments, further analysis is performed to identify exceptional conditions that require special handling. These conditions include multiple occurrences of the same word within the search phrase and the existence of a word with exceptionally high usage within the domain (e.g. articles such as 'the', 'and', 'a' or domain-specific common words, such as 'love', 'orchestra', 'major'). The results of this analysis are stored with each keyword identifier.

When the initial processing of managing the search phrase in actions 604, 606, 608, and 612 is complete, a top-level product 'traversal' begins through an index that correlates or maps keywords to attributes. An iterative search is performed to locate the first product for which each of the keyword identifiers are found in at least one attribute associated at any level of the product hierarchy. If no products are found, again a process can be initiated to determine an alternate suggested search phrase, or an error message stating no results were found may be returned to the user. In some embodiments of method 600, the product is more generally a whole and the sub-product is more generally a part. In some embodiments, the product is more specifically an album and the sub-product is more specifically a track.

If all of the words 608 are present in the lexicon, then matches of the words in the search phrase are found 614 by search engine 106 in a database for the parsed words at product and sub-product levels. In some embodiments of action 614, the database is searched for products that contain all of the parsed words in at least one product level or sub-product level attribute.

All of the attributes of each product and all of the attributes of its sub-products are analyzed and/or considered simultaneously, using the level of the attribute as one of the factors that determines the relevance of the product within the context of the user's search input. Unique descriptive information about a product may not be associated directly to every product in a product hierarchy in a database. Nonetheless, to achieve the best possible search results, all descriptive information is considered in locating product matches and determining their relevance to a user's search.

The relevance engine that performs the remaining actions in method 600 considers the relative weight of attribute types and the quality of the match between keywords and attributes to determine the relevance of all potential matches. The relevance engine considers the level in the product hierarchy each attribute is related to and further controls the ordering and display of results based on the intention of the search. The relevance engine exhaustively considers all possible combinations of all potential hits and determines the "best" possible hit by this relevance.

When all of the information required for the function is available, various types of elimination algorithms are used to ensure the least amount of processing possible is done while still getting accurate results. Two types of early-elimination processing used in method 600 are elimination if "Refine-By" criteria are not met and elimination if "Special Handling" criteria are not met. An example of the latter for common words is to put additional constraints on how the words can be used in the attributes to qualify as a potential match (e.g. proximity).

In some embodiments, thereafter, products that were yielded from the database search 614, are eliminated from further consideration using refining criteria 616. In some embodiments, each product that was yielded from the database search is compared and/or checked against a refine-by criteria, and each product that does not match the refine-by criteria is eliminated from further consideration. Refine-by criteria provides additional criteria to further select between search results.

Best hits are determined 618 for each product that remains under consideration. In some embodiments, the parsed words and the matching attributes within the products are submitted to a relevance engine, and the relevance engine identifies the best match with the parsed words and the attributes associated with the products, including the product description. The best match is determined by evaluating each of the hits, a hit being an occurrence of all the words in any combination within one or more of the attributes of the products. In other embodiments, instead of product attributes, attributes of sub-products, or a combination of product and sub-product attributes are submitted to the relevance engine with the parsed words to determine the best match for each sub-product or combination of product and sub-product.

There can be many potential hits within the same product. For example, a keyword can be used more than once within an attribute or within many different attributes. Therefore, each potential hit must be evaluated against the rest to determine the "best" possible hit. The evaluation is performed to make the final ordering of the results by relevance accurate. A score is given to each possible combination of each potential hit. The hit with the lowest score is determined to be the "best" possible hit within the overall product hierarchy and the entered set of keywords.

In some embodiments, the product's best hit is stored in an internal results set, while the rest of the index is traversed and the process repeated for each potential product match. In some embodiments, sort-on-insert storage techniques are used to eliminate full sorting of the results set prior to transmission.

At this point in method 600, approximately all potential matches are located within the Keyword->Attribute index 1500.

The actions eliminating 616 matches that do not fit refine-by criteria, and determining 618 best hits are repeated for each matching product in the database. Thereafter, the remainder of the method is performed on the best hits from action 618.

Subsequently, final processing is performed in accordance with a display intention that is associated with the search. The display intention is derived from the search intention. The search intention is not derived from the search phrase that is received in action 602. In some embodiments, the source of the search intention is the environment that method 600 is performed in of which a user has no control. One example of such a source is state information on a computer system that performs method 600. The state information is set or defined by the organization that hosts, sponsors or supports the computer system. In some embodiments of the state information, the search intention corresponds to the selection of templates and rule sets as described in more detail below in this section. In some embodiments, the source of the search intention is a user. A final processing of method 600 includes the grouping and ordering of a results set that includes both products and sub-products for final display. The significant aspects of the final processing relate the relevance and search intention of the best hits identified in action 618: The calculated relevance score of a hit; and a Rule Set describing the "intention" of the search (e.g. Product or Sub-Product Bias).

Ordering of information is done as soon as possible and with as minimal an impact on performance as possible. However, there is one more component, referred to as the display 'templates', which plays a role in organizing and displaying product and sub-product matches.

The templates defined in some embodiments include: product (product biased), hybrid (product biased) and sub-product (sub-product biased) templates. The above list also identifies a Rule Set used in each of the templates. The template ultimately determines (a) what parts of the search will be performed, (b) the internal ordering of results within temporary structures, and (c) what attribute types are included in the display and how they are displayed.

The display template is the part of the engine that determines what parts of the search will be performed with each execution of the search. For example, if a site has put up a traditional online record store that only sells albums, a template that does not independently display sub-products, or tracks, would be used. A template that does not display sub-products would cause only the top-level product pass to be executed during a search.

Also, when designing a template, the Refine-Bys that are to be available to the user are identified. Attribute lists used in Refine-Bys are dynamically populated during each search execution. When a Refine-By is selected, a search with active Refine-Bys is executed, potential matches that do not meet the Refine-By criteria are eliminated from the results set. A mechanism for operating multiple refine-bys is provided in some embodiments and built into the display templates.

The template being used also affects the internal ordering of products and sub-products in temporary structures, which ultimately affects how products are grouped and displayed to the end user. Two types of orderings used in some implementations are (1) products and sub-products ordered within product hierarchies by relevance and a combination of other non-calculated sort criteria (alphabetical, release date, etc.), and (2) products and sub-products ordered as individual units by relevance and other non-calculated sort criteria.

Multiple ordering criteria can be used simultaneously as long as they can be sequentially applied (e.g. first by relevance, then by release date, then by availability, etc.). Some embodiments uniquely provide accurate search and relevance results for both products and sub-products at the same time.

If the data sets the engine uses at run-time support it, some embodiments provide inverted views, such that all products that contain a certain sub-product can be displayed grouped together. Inverted views are desirable when the same sub-product exists on multiple versions of a product (such as a track on multiple albums or versions of albums), or are included in different types of "packaged deals." An inverted view is accomplished by template rules that prescribe the ordering of products and sub-products in temporary structures such that there is a grouping by sub-product identifiers as opposed to product identifiers. Having both products and sub-products together provide a great deal of flexibility in how products and sub-products can be dynamically "bundled" for display to the end user.

Lastly, the templates define which attributes are displayed in the results sets for each type of product hierarchy (sub-domain) and how they are laid out on the display. Which attributes are displayed and the layout of those attributes will most likely be different for each type of product hierarchy, if there are different types of attributes for each.

A determination of the search intention is made 620. If the intention is to display product information only, then the products are organized 622 by a product-level relevancy score. In this case, only one pass through the indices is performed. This product pass considers all possible hit combinations across all attributes at both the product and sub-product levels. If the intention of the search is to return sub-products as well as products, multiple passes are made through the indices in ever narrowing-sweeps to bring back matching products from all levels of a product hierarchy.

If the intention of the search is to display product information, a determination 624 of the validity of the sub-product matches using product-biased rules for each product is made. Then, the validated sub-products are organized 626 within each product. Thereafter, the products and sub-products are merged and sorted 628 using product biased rules.

Subsequently the results of action 622 or action 628 are transmitted to the computer from which the search phrase originated, for transmission 630.

In some embodiments, the relevance engine performs actions 614-628.

Figure 7:
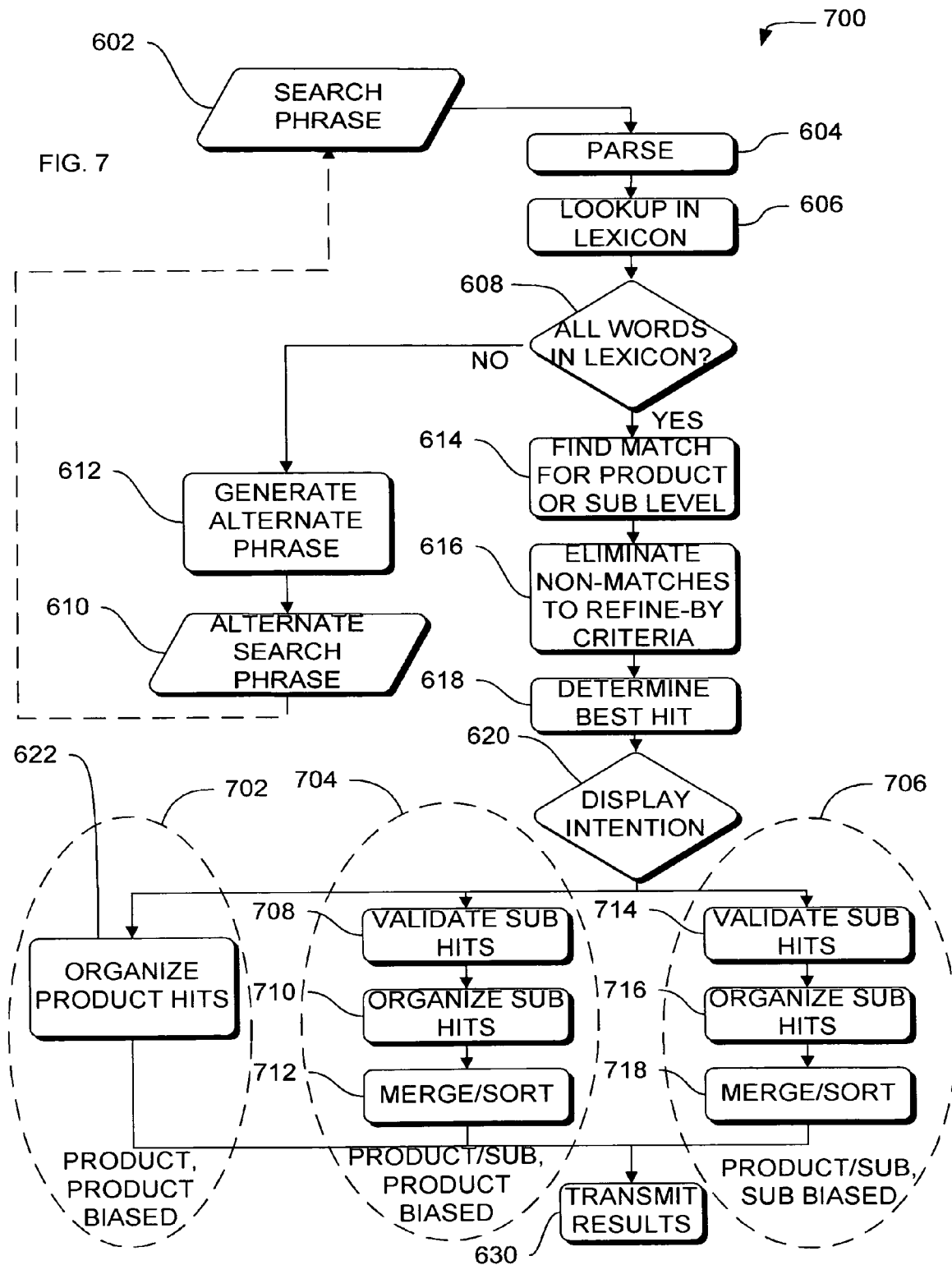
FIG. 7 is a flowchart of a method to locate one or more products that are individually saleable, in terms of product and sub-product hierarchy, performed by a server according to an embodiment.

Turning to FIG. 7, a flowchart of a method 700 performed by a server according to an embodiment is presented. Method 700 fulfills the need in the art for locating one or more products that are individually saleable, in terms of product and sub-product hierarchy. In method 700, a single execution of a search is initiated upon a user entering a search phrase (any number of words) into a single text field on a user interface.

If the intention of the search (as determined prior to executing the search) is to return only top-level products, the only remaining action before transmission is to perform the final processing 702 to transmit the results in the pre-defined results display template. If the intention of the search is to bring back sub-products as well as products, further processing 704 and 706 is done on each of the matched products to identify valid sub-product hits within the hierarchies.

A determination of the search intention is made 620. Depending on the intention of the search, there can be one or more passes through the indices to locate and order matches. If the intention is to display product information only, and biased towards product, then in some embodiments, the actions in section 702 are performed. If the intention is to display product and sub-product information, and biased towards product, then the actions in section 704 are performed. If the intention is to display product and sub-product information, and biased towards sub-product, then the actions in section 706 are performed.

In section 702, to prepare for transmission of only product information, with a bias towards product, then the products are organized 622 by a product-level relevancy score. In this case, only one pass through the indices is performed. This product pass considers all possible hit combinations across all attributes at both the product and sub-product levels. If the intention of the search is to return sub-products as well as products, multiple passes are made through the indices in ever narrowing-sweeps to bring back matching products from all levels of a product hierarchy.

In section 704, to prepare for transmission of product and sub-product information, and biased towards product, the sub-product matches are validated. In some embodiments, a determination 708 of the validity of the sub-product matches using product-biased rules for each product is made. Then, the validated sub-products are organized 710 within each product. Thereafter, the products and sub-products are merged and sorted 712 using product biased rules.

In section 706, to prepare for transmission of product and sub-product information, and biased towards sub-product, the sub-product matches are validated. In some embodiments, a determination 714 of the validity of the sub-product matches using sub-product-biased rules for each product is made. Then, the validated sub-products are organized 716 within each product. Thereafter, the products and sub-products are merged and sorted 718 using sub-product biased rules.

In some embodiments of 704 and 706, to locate valid sub-product hits, the following is performed. For each top-level product match previously identified, additional passes through the hierarchies are made by stepping down one level of the hierarchy at a time and identifying all sub-products at that level for which each of the keyword identifiers are found in at least one attribute associated at the current level or below. Once a potential sub-product hit is identified, a set of rules consistent with the intention of the search is applied to determine if it is a 'valid' sub-product hit for the search. An example of application of a search intention is a rule that specifies that a sub-product should only be included in the result set if all keywords were found within attributes of only that sub-product. These rules enforce additional relationships and dependencies between attribute types and levels. Once a valid set of sub-products is identified, the processing required to locate the 'best' possible hit (as described previously for products) is performed for each sub-product. The best hit for each valid sub-product is then stored in an internal structure ordered by parent product and relevance score.

In some embodiments of 704 and 706, when there are both products and sub-products brought back in a search, the final step of the search engine processing is a 'merge' operation that takes the two internal structures and combines the results. The results are combined based on rules specified in a Rule Set.

In some embodiments of 704 and 706, subsequently the results are transmitted to the computer from which the search phrase originated, for transmission 630. The results are presented in a way that preserves the relationships between products and sub-products.

In some embodiments of method 700, the relevance engine performs actions 702-718.

Figure 8:
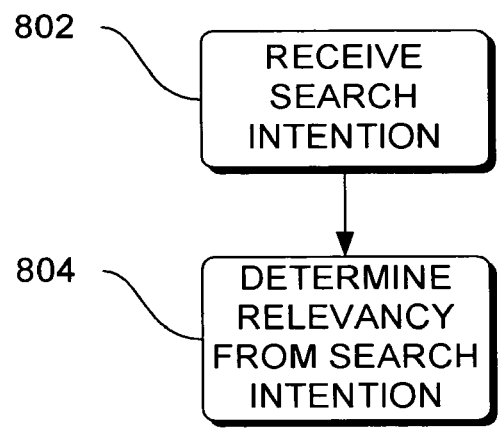
FIG. 8 is a flowchart of a method to locate one or more products that are individually saleable, in terms of product and sub-product hierarchy, performed by a server according to an embodiment.

Turning to FIG. 8, a flowchart of a method 800 performed by a server according to an embodiment is presented. Method 800 fulfills the need in the art for locating one or more products that are individually saleable, in terms of product and sub-product hierarchy.

Method 800 includes receiving 802 information describing an intention of a search. Examples of the search intention include intent to search for products or intent to search for sub-products. Because the product hierarchy as shown in FIG. 4 is the core organization of searchable metadata, the relevancy engine 304 in FIG. 3 inherently supports multiple types of searches (e.g. product-biased and sub-product biased) with the same instance of a search engine server. The types of searches are the 'intention' of the search. In some embodiments, the source of the search intention is a computer system that performs method 800, as further described above in method 600.

Method 800 also includes determining 804 relevancy of search results in reference to the intention of the search. To search multiple intentions with the same instance of the search engine 106 in FIG. 1, an overriding 'Rule Set' is in effect when the search is performed. The Rule Sets, together with the Templates described in FIG. 12 provide an ability to flexibly tailor the operation of the search for many potential uses. Examples of a music Rule Set are described in FIG. 11.

In some embodiments, two Rule Sets are created—one Rule Set that is biased towards selecting wholes and one that is biased towards selecting parts. In general, a whole-biased rule set favors top-level wholes as the primary ordering criteria, and organizes individual hits of parts by relevance within top-level wholes. A parts-biased rule set favors hits of parts over hits of wholes. In one example, a whole further comprises a product and a part further comprises a sub-product. In a further example, a product further comprises an album and a part further comprises a track.

In some embodiments, a Rule Set contains several components. First, the Rule Set contains rules about the relative ordering of attribute importance based on the intention of the search. Attribute types and weights are specific to the domain or sub-domain of data being used by the search. However, there is also an aspect that can impose a 'reordering' of attribute importance during relevance calculation based on the intention of the search. For example, when doing a search that favors the return of album products over track sub-products, a match in an album title is most likely more relevant than the same match in a track title. However when the intention of the search is to retrieve track sub-products, the match in the track sub-products is more relevant. Both attributes would be used in both types of searches, but matches within each type of attribute would have different relevance. Thus, the calculation of the relevance score is affected by the intention of the search.

Another component of the Rule Set is rules that serve to customize how matches within different attribute types at different product levels affect the overall inclusion of a product in a result set. The determination is made by comparing matched attributes to the combination of attribute types that are valid or invalid in reference to the Rule Set. An example of one combination from an embodiment involving music recording, within the domain of music is a rule from a sub-product biased rule set that requires keyword matches within sub-product attributes to all occur within the same sub-product. Using such rules to eliminate what are most likely unintentional matches enhances the quality of the result set.

Rules regarding the way products are organized for final display are also defined by the 'intention' of the search. How the relevance scores of the parent products and sub-products are combined and used during 'merge' operations 734 and 740 is a part of the Rule Set. Once all valid product-level and sub-product level hits are located, a final ordering based on calculated relevance weights occurs.

In some embodiments, two sub-domains within music are implemented: Classical and Popular. Each of these sub-domains includes a unique set of product hierarchies, attribute types, and attribute type weights. The 'Rule Sets', however, are defined at the domain level. Both Popular and Classical music product engines can be implemented using the same two Music domain 'Rule Sets' to display products and sub-products.

Figure 9:
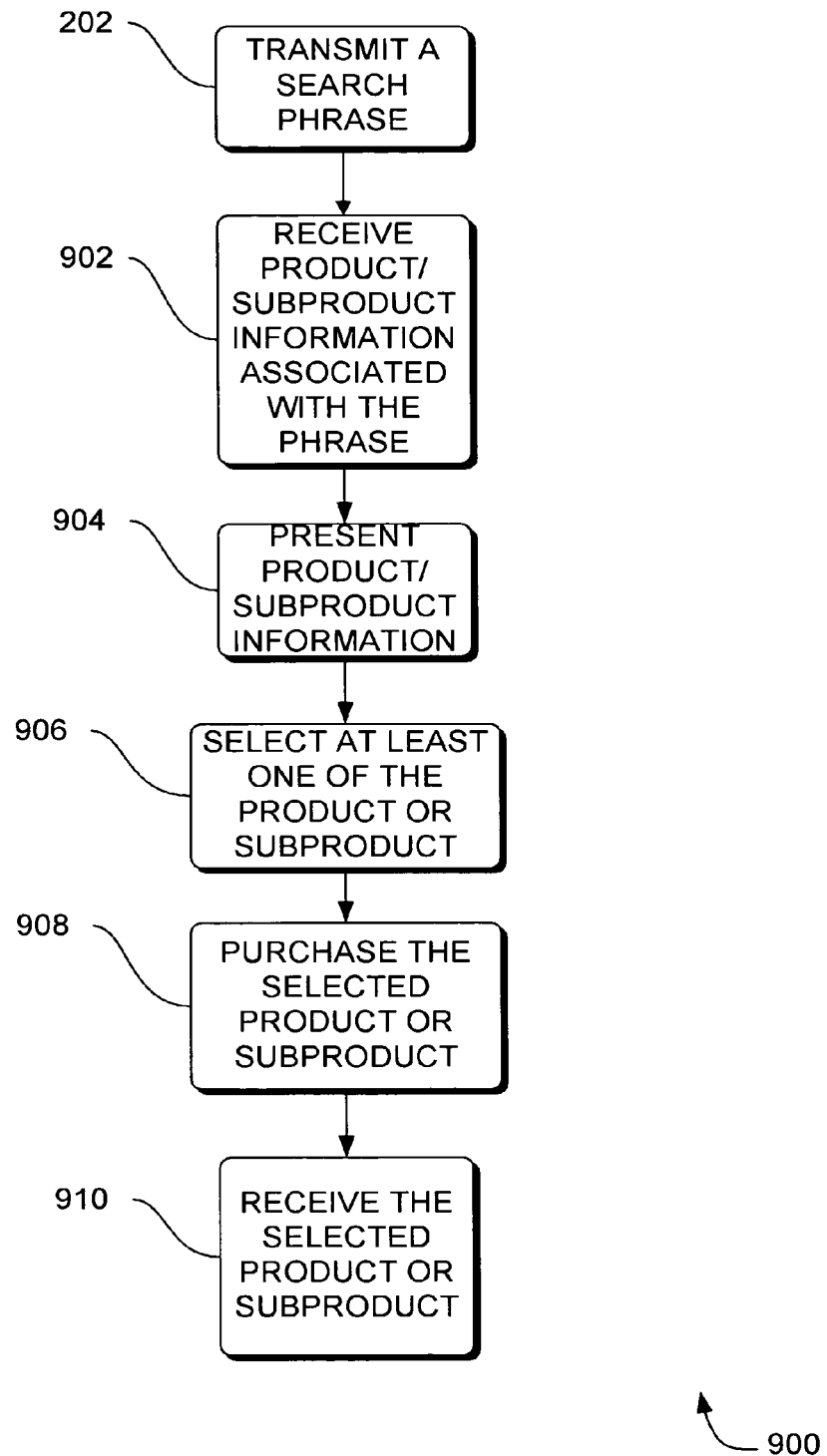
FIG. 9 is a flowchart of a method to locate one or more products that are individually saleable, in terms of product and sub-product hierarchy, performed by a client according to an embodiment.

Turning to FIG. 9, a flowchart of a method 900 performed by a client according to an embodiment is presented. Method 900 fulfills the need in the art for locating one or more products that are individually saleable, in terms of product and sub-product hierarchy.

Method 900 includes transmitting 202 a search phrase to a computer, such as a search server operably coupled to the transmitting computer through the Internet. In some embodiments, the search phrase is transmitted to a server operable to perform any one of methods 100, 300, 500, 600, 700, 900, and 1000.

Method 900 also includes receiving 902 information that describes at least one sub-product of at least one product. The sub-product information is received from the same computer that received the transmitted search phrase. The receiving 902 occurs in response and in reference to the transmitting 202 of the search phrase. Action 802 is one embodiment of receiving 204 whole/part information associated with the search phrase in FIG. 2.

In some embodiments, method 900 also includes presenting 904 the information describing the at least one product and the at least one sub-product. In some embodiments, the presenting 904 is visually displaying the information.

In some embodiments, method 900 also includes selecting 906 one of the at least one product, or one of the at least one sub-product. In some embodiments, the selecting 906 is accomplished by receiving an indication from a user of a selection such as receiving an indication that a user selected a radio button associated with the product or sub-product.

In some embodiments, method 900 also includes purchasing 908 the selected product or sub-product. In some embodiments of purchasing 900, the user of the computer enters and/or approves payment information.

In some embodiments, method 900 also includes receiving 910 the purchased product or sub-product. In some embodiments, the purchased product or sub-product is received through a delivery service such as a government postal service or a private package delivery company.

Figure 10:
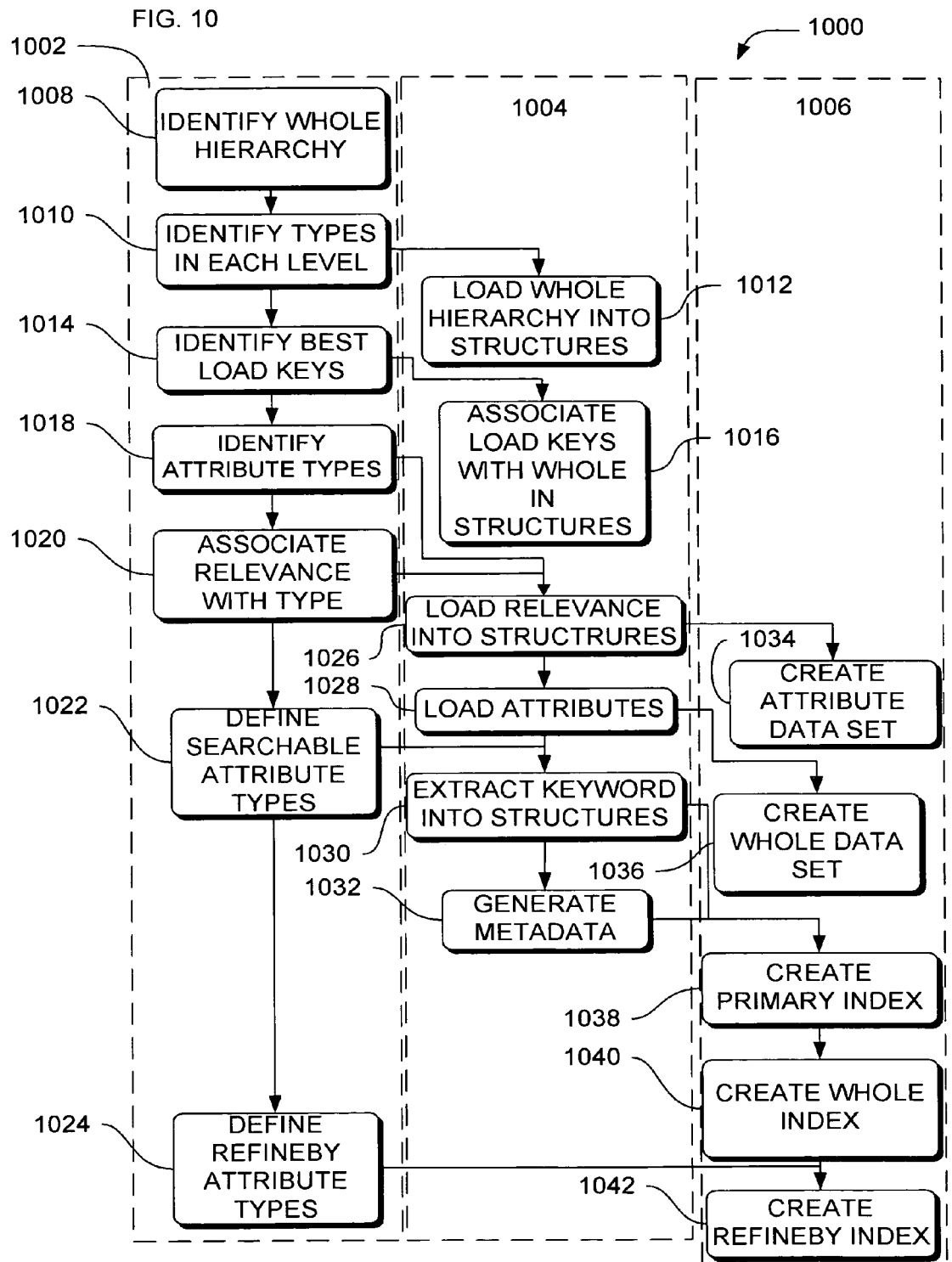
FIG. 10 is a flowchart of a method to transform and index data stored in structures to be accessed by a search engine at run-time to achieve a whole/part search, performed by a client according to an embodiment.

Turning to FIG. 10, a flowchart of a method 1000 according to an embodiment is presented. Method 1000 transforms and indexes data stored in structures such as relational structures or extensible markup language (XML) documents such that it can be used by a search engine at run-time to achieve a whole/part search in accordance with methods 100, 300, 500, 600, 700, 800, 900, and/or 1000. One example of data that is transformed and indexed by method 1000 is music industry data available from Muze, Inc. of New City, N.Y. Method 1000 fulfills the need in the art for locating and distributing one or more products that can be distributed individually, fulfills the need for more complete searches, and fulfills the need for results that fit the search criteria, and coherent ordering of the search results.

A product with its component parts can be thought of as a "hierarchy" of products and sub-products. In the example of a music product implementation, such product hierarchies include albums containing downloadable tracks. In the example of a software product implementation, such product hierarchies include software packages containing individually offered software modules. Music product hierarchies in some embodiments are described in FIG. 13 and FIG. 14. The product/sub-product hierarchies supported in some embodiments can contain any number of levels, the number of levels being limited only by computer resources and data resources.

In general, method 1000 involves extracting 1002 data from its original form stored in structures such as relational structures (e.g. XML documents), and loading 1004 the data into intermediate transform structures where various types of extract, data transformation, and excerpting processes are performed, and finally generating 1006 the optimized indices that are accessed at run-time by the search engine (either in-memory or on disk as resources allow). Note that both data sets (e.g. elements of data required for display) and indices are generated during performance of method 1000, as these components represent the entire set of data used by the search engine at run-time. In some embodiments, extracting 1002 data from its original form is performed by a human.

Method 1000 includes analyzing the source domain and source data to identify 1008 each of the potential product hierarchies in the domain. Analysis of the product hierarchies yields product types, which are ultimately used to identify 1010 members of a particular level in a product hierarchy.

Method 1000 also includes loading 1012 products into transform structures in which unique numeric identifiers are assigned to each product. These identifiers are used in the indices. Each product's relationship to a parent product (if any) is carefully maintained in the transform structures, and ultimately passed through into the data sets and indices used by the search engine at run-time.

Method 1000 also includes identifying 1014 unique keys for each type of product. The unique keys are one or more actual data elements, and allow attributes to be associated with the products in indices. The unique keys are referred to as load keys. Sample load keys in the music domain are, for an album, a universal product code (UPC), or if not available, combinations such as label and catalog number. In some embodiments, for tracks, an ISRC code (unique recording number) is used if available, or combinations such as UPC volume number and track number can be used. Selection of the load keys is important, as the load keys exist as unique identifiers within each of the data sources that will provide searchable (or non-searchable) attributes to the search engine.

The load keys are persistently associated 1016 with products in the transform structures such that attributes from multiple data sources are in a ready state to be mapped and merged into the indices.

Further analysis of the domain in method 1000 identifies 1018 the set of attribute types with each product type that are available for use by the search engine. In addition, a relevance weight is associated 1020 with an attribute type.

Attributes are either searchable or non-searchable. The search engine that uses the data structure examines searchable attributes directly to determine potential matches during execution. Searchable attribute types are defined 1022.

Non-searchable attributes are defined 1024 to facilitate browsing, to help sort results in the end-user display, as refine-by attributes (described herein), and to enhance product display within the engine. In some embodiments, the set of attributes that will be used in a specific implementation's Refine-Bys are defined 1024. Refine-Bys are navigational aids that are dynamically populated to suggest attribute values to help narrow a user's search. Refine-Bys can use either searchable or non-searchable attributes. An example of a searchable Refine-By in the Music domain would be 'Artist' or 'Composer.' An example of a non-searchable Refine-By attribute would be 'Release Date' or 'Price.' Attributes considered non-searchable may also be loaded into transform structures.

Method 1000 also includes loading 1026 the attribute types identified in action 1018 and the associated relevance weight from action 1020 in the transform structures. Thereafter, the attributes that are associated with products are loaded 1028 into the transform structures.

Forthwith, unique keywords are extracted 1030 from parsed versions of each of the searchable attributes and also assigned unique numeric identifiers. This set of unique identifiers & keywords becomes the system's central lexicon. Once the keywords are extracted, an intermediate structure is created that contains a reference from each unique keyword identifier to each of its occurrences in the product and sub-product attributes.

In the last action of loading transform structures, metadata is generated 1032 from keywords and attributes. The metadata includes keyword index components that describe the relationship of keywords and attributes. To generate 1032 the metadata, detailed processing of each occurrence of each keyword in each attribute is performed. Specifically, information about the relationship between the keyword and the attribute (such as positional information of keywords within each attribute) is captured.

Decisions are made throughout the process of analyzing the domain 1002 and creating 1004 transform structures on what degree of data cleansing is required for each type of attribute loaded. In some embodiments, data cleansing is performed on import from the source data set into the intermediate structures. As with products, unique numeric identifiers are assigned as attributes are loaded. Note that there are no theoretical limits to the number of products, product types, attributes, or attribute types that can be handled by the system. Limits on capacity are solely determined by available resources (processing, memory, disk).

Indices that are used by the search engine are generated 1006 after the transform structure that each of the indices are dependent upon are generated 1004.

In the generating 1006 of indices, a type data set index is generated 1034. The type data set is the set of attribute types along with their relevance weights used in creation of the indices. This important set of data is key to interpreting the indices for the search engine.

Method 1000 also includes generating 1036 a product data set, if the search engine is to provide display of a product onscreen. In some embodiments, the product data set index is created in an optimized format to achieve quick-access to all of the attributes known to the system.

Method 1000 includes generating 1038 a primary index that maps keywords to attributes. The primary index includes keyword references that lead to all of the products and sub-products that use the keyword somewhere in their associated attributes. The primary index also contains the set of metadata needed to determine relevance of a hit.

Method 1000 also includes generating 1040 the product index that maps products to keywords. The product index is a purely performance-related index used by the search engine during execution.

Another action in method 1000 is to generate 1042 an index that supports Refine-Bys from the transform structures once the set of attributes required by the instance of the search engine within the domain is determined.

Various embodiments of data structures can be used to create these indices, and similarly many possible search and sort algorithms to traverse them. The important component for the operation of some embodiments is that the relationships between products and sub-products are maintained and readily available within the indices.

In method 1000, there is a specific dependency between steps of analysis, steps of transform processing, and creation of the data sets and indices used by the search engine. However, as long as these dependencies are maintained, much of this processing can be performed in parallel.

Figure 21:
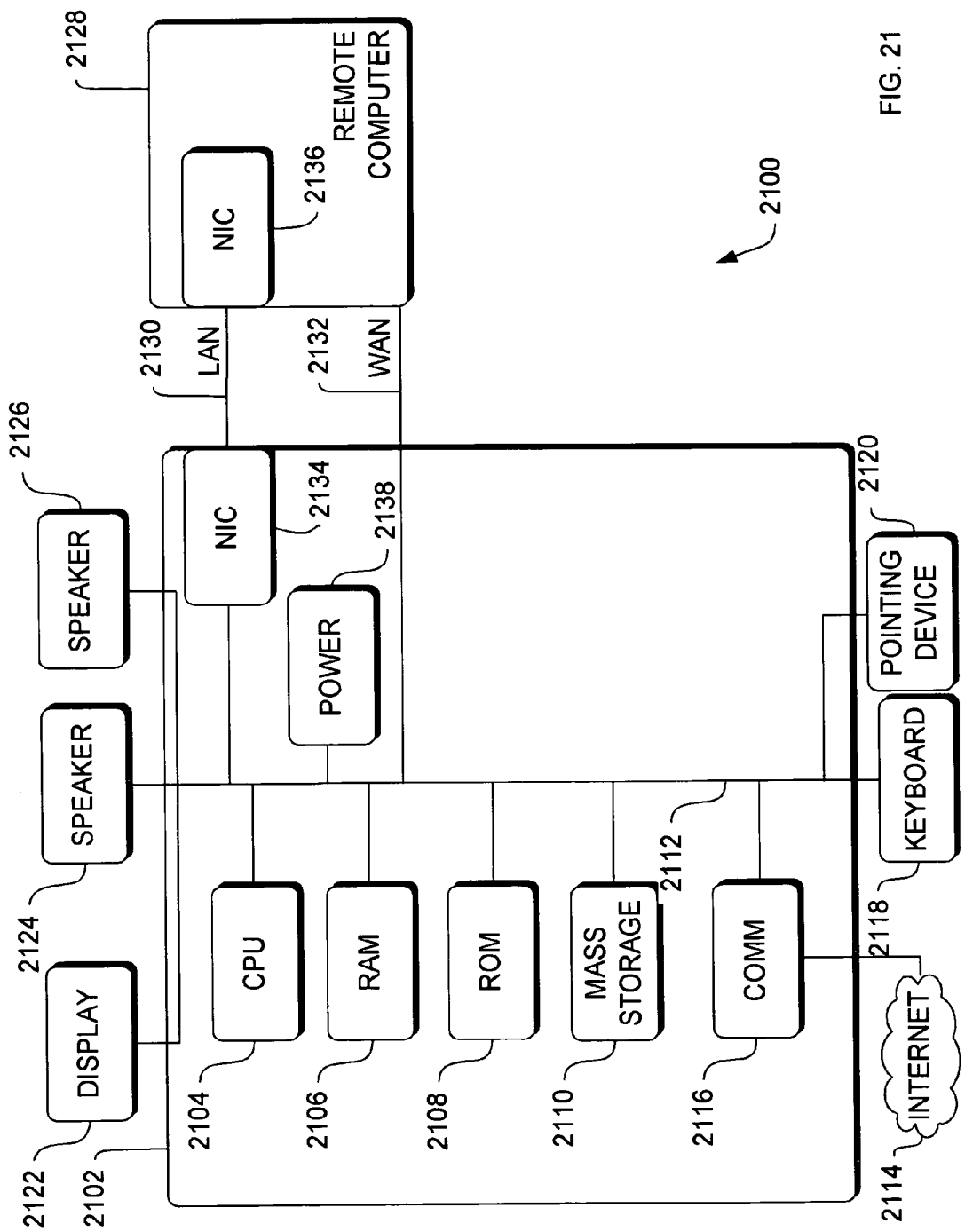
FIG. 21 is a block diagram of the hardware and operating environment in which different embodiments can be practiced.

In some embodiments, methods 100, 200, and 500-1000 are implemented as a sequence of computer instructions which, when executed by a processor, such as processor 2104 in FIG. 21, cause the processor to perform the respective method. In other embodiments, methods 100, 200 and 500-1000 are implemented as a computer-accessible medium having executable instructions capable of directing a processor, such as processor 2104 in FIG. 21, to perform the respective method. In varying embodiments, the medium is a magnetic medium, an electronic medium, or an optical medium.

Music Product Implementation

Referring to FIGS. 11-16, particular Music product implementations are described in conjunction with the system overviews in FIG. 1-4 and the methods described in conjunction with FIGS. 1, 2, 3 and 5-10.

Figure 11:
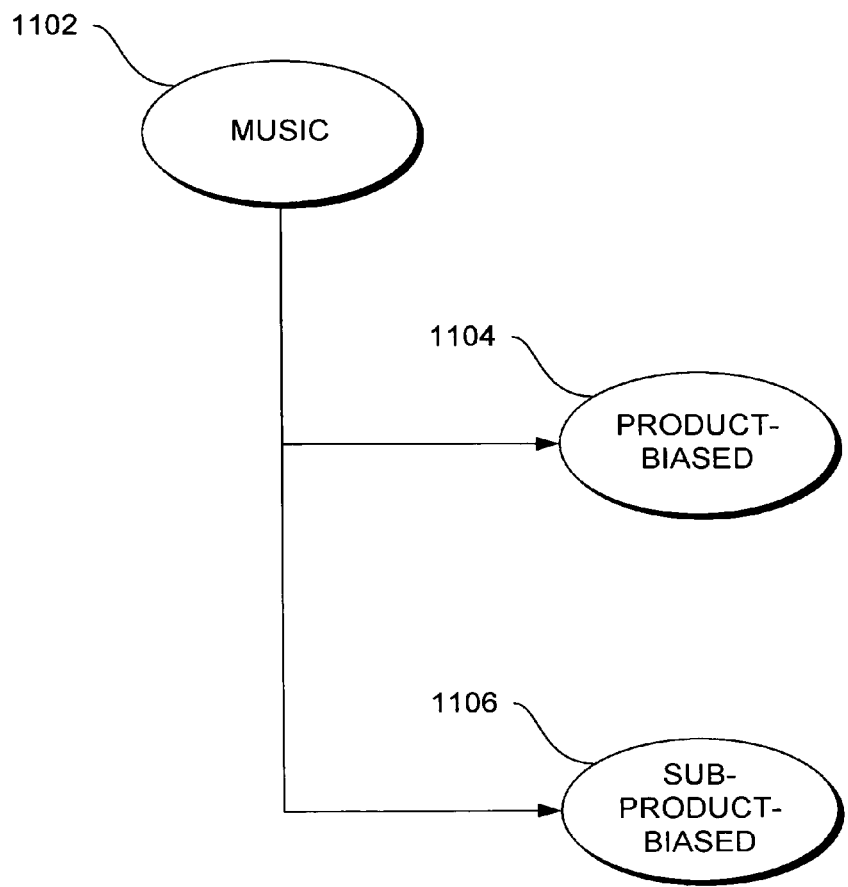
FIG. 11 is a block diagram of Rule Sets for music products according to an embodiment.
Figure 12:
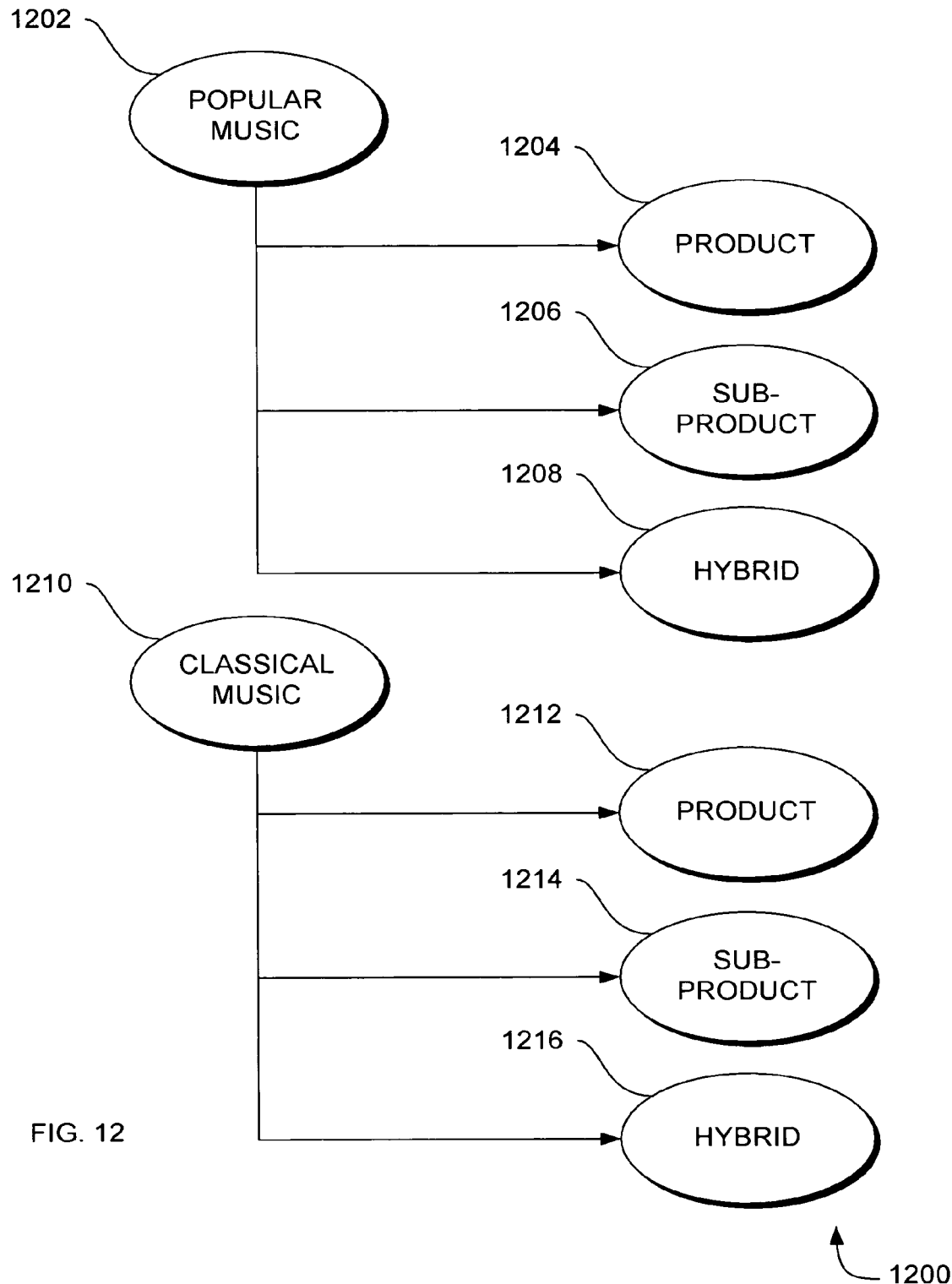
FIG. 12 includes block diagrams of popular music templates and classical music templates according to an embodiment.

Turning to FIG. 11, a block diagram of multiple music Rule Sets 1100 for music products according to an embodiment is presented. Music Rule Sets 1100 exist with the context of a domain. Music Rule Sets 1100 optimize relevance determination and observation for music recording products and sub-products.

The Music domain 1102 includes a whole-biased Rule Set 1104, and a parts-biased Rule Set 1106. Whole-biased Rule Set 1104 and parts-biased Rule Set 1106 further define the wholes and parts Rule Sets for music. In one example, a whole-biased Rule Set 1104 further comprises a product-biased Rule Set and a parts-biased Rule Set 1106 further comprises a sub-product-biased Rule Set. In a further example, a product-biased Rule Set further comprises an album-biased Rule Set and a parts-biased Rule Set further comprises a track-biased Rule Set.

Turning to FIG. 12, block diagrams of a popular music template and a classical music template according to an embodiment are presented. Templates 1200 exist with the context of a sub-domain of a music domain.

The set of Popular music templates 1202 indicates that one of the product template 1204, sub-product template 1206 or hybrid template (i.e. a combination of products and sub-products) 1208 is to be used during processing. The processing includes performing some number of passes as determined by one of the templates 1204, 1206 or 1208 to identify valid product and sub-product matches. The product template 1204 implies one pass through the data. The sub-product template 1206 and hybrid template 1208 imply multiple passes through the data The popular music templates 1202 also indicate the product-subordering and the sub-product subordering in the internal transform structures and further indicate which attributes are displayed.

The set of Classical music templates 1210 indicates that one of product template 1212, sub-product template 1214 or hybrid template (i.e. a combination of products and sub-products) 1216 is to be used during processing. The processing includes performing some number of passes as determined by one of the templates 1212, 1214 or 1216 to identify valid product and sub-product matches. The product template 1212 implies one pass through the data. The sub-product template 1214 and hybrid template 1216 imply multiple passes through the data The classical music templates 1210 also indicate the product-subordering and the sub-product subordering in the internal transform structures and further indicate which attributes are displayed.

Figure 13:
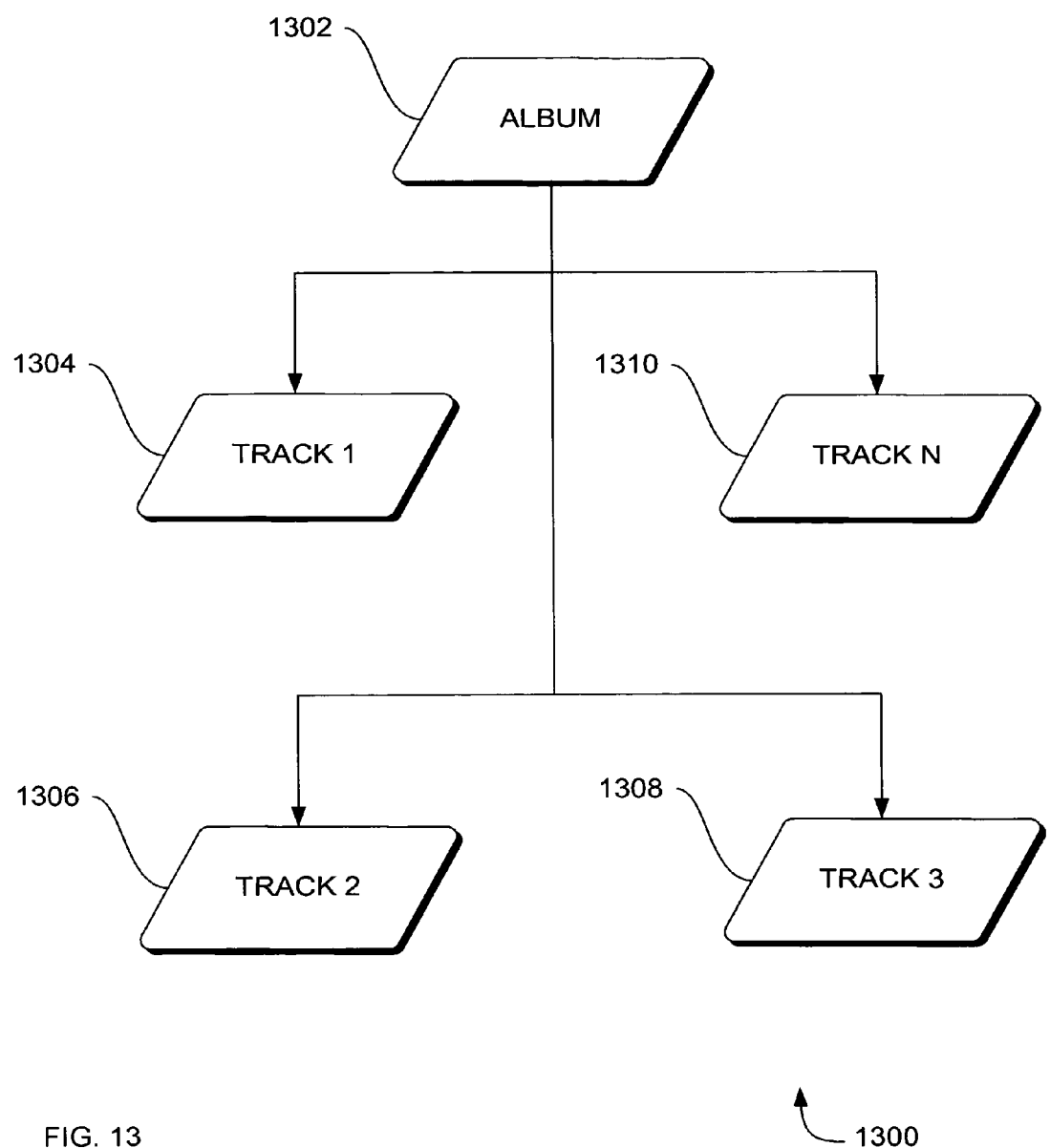
FIG. 13 is a block diagram of a hierarchy of a music product and sub-products according to an embodiment.

FIG. 13 is a block diagram of a hierarchy 1300 of a music product and sub-products according to an embodiment. In this embodiment, a product comprises an album 1302. Examples of physical embodiments of the album 1302 include a compact disc (CD), a long-playing record (LP) and cassette tapes. Examples of digital embodiments of the album include a bundle of downloads, digital streams, and ring tones.

The album 1302 further comprises portions that are sub-products track1 1304, track2 1306, track3 1308 and track N 1310. Examples of physical embodiments of the sub-products include CD singles and cassette singles. Examples of digital embodiments of the sub-products include a download, a stream and a ring tone.

Hierarchy 1300 fulfills the need in the art for locating one or more portions of wholes that can be distributed individually. In this embodiment, hierarchy 1300 allows tracks of albums to be distributed individually.

Figure 14:
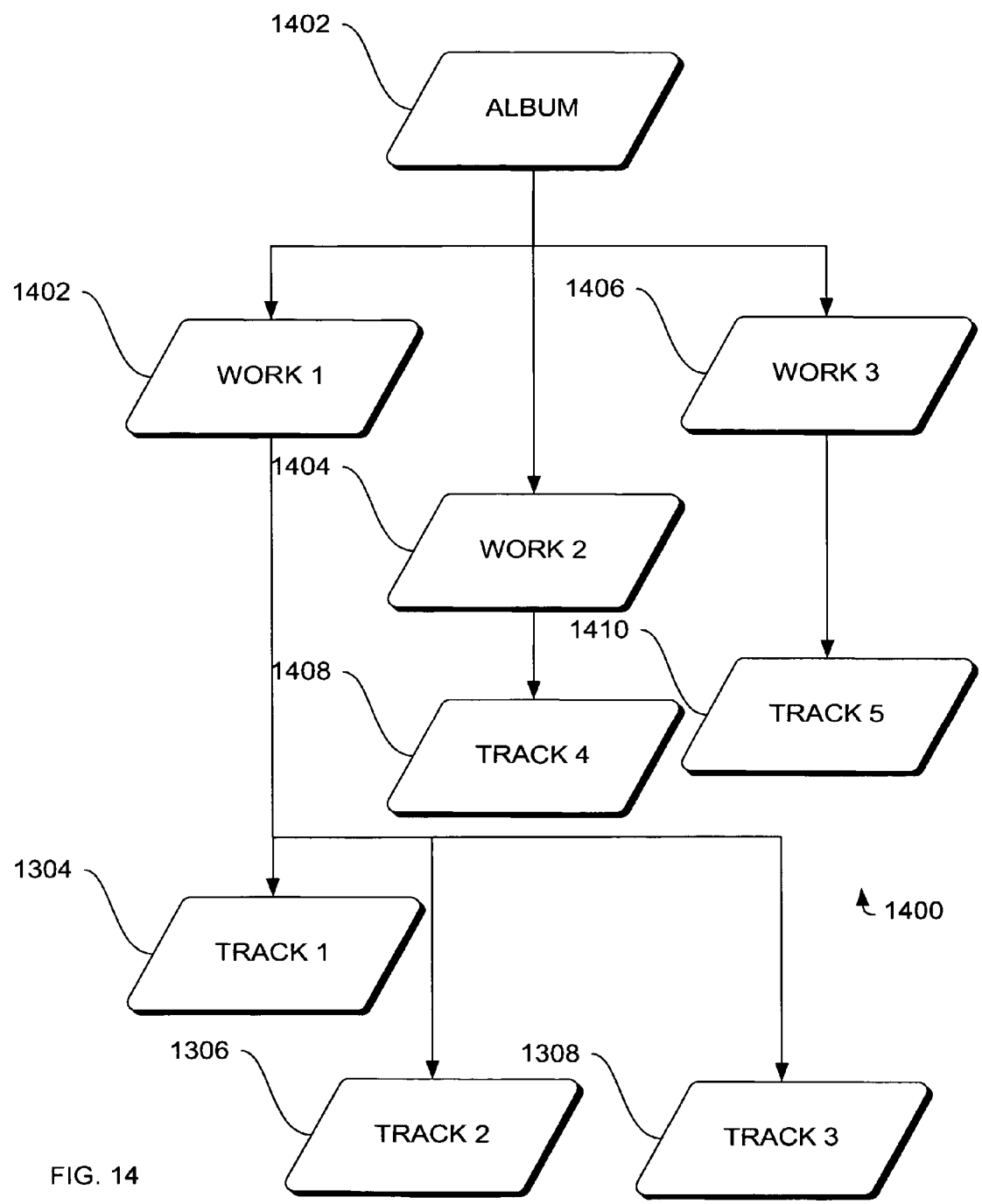
FIG. 14 is a block diagram of a hierarchy of a music product and sub-products according to an embodiment having three levels in the hierarchy.

FIG. 14 is a block diagram of a hierarchy 1400 of a music product and sub-products according to an embodiment having 3 levels in the hierarchy. The album 1402 further comprises an extra level of one or more tracks, Work1 1402, Work2 1404 and Work3 1406.

Work1 further comprises sub-products track1 1304, track2 1306, and track3 1308 that are directly associated with album 1302 in FIG. 13. Work2 comprises sub-product Track4 1408. Work3 comprises sub-product Track5 1410.

Hierarchy 1400 fulfills the need in the art for locating one or more portions of wholes that can be distributed individually. In this embodiment, hierarchy 1400 allows tracks of albums to be distributed individually, and works, or sub-groupings of tracks to be distributed individually.

Figure 15:
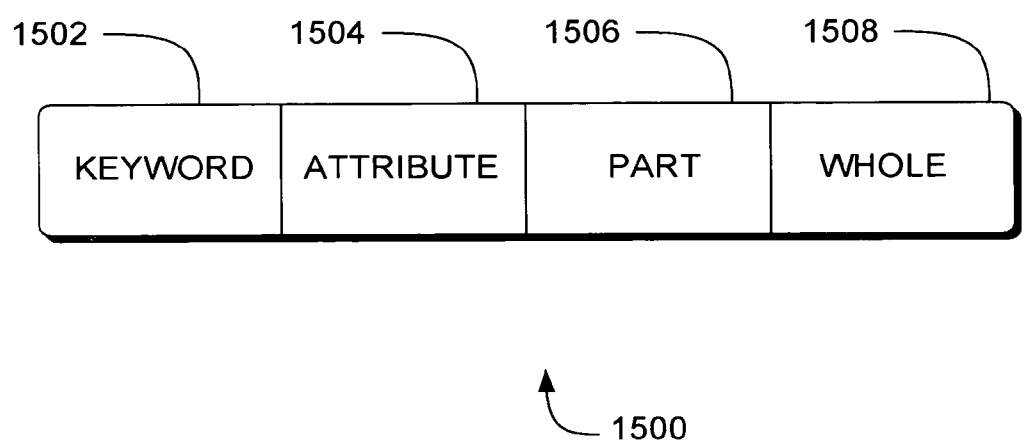
FIG. 15 is a block diagram of a data structure to associate keywords to attributes, according to an embodiment.

FIG. 15 is a block diagram of a data structure 1500 to associate keywords to attributes, according to an embodiment. Data structure 1500 is created by action 1038, creating a primary index, in FIG. 10. Data structure 1500 is also referred to as the Keyword->Attribute index.

Data structure 1500 includes a field storing data representing a keyword 1502. The field storing data representing a keyword 1502 is associated with a field storing data representing an attribute 1504. The field storing data representing an attribute 1504 is associated with a field storing data representing a part 1506. In some embodiments, the field storing data representing a part 1506 is associated with a field storing data representing a whole 1508.

Figure 16:
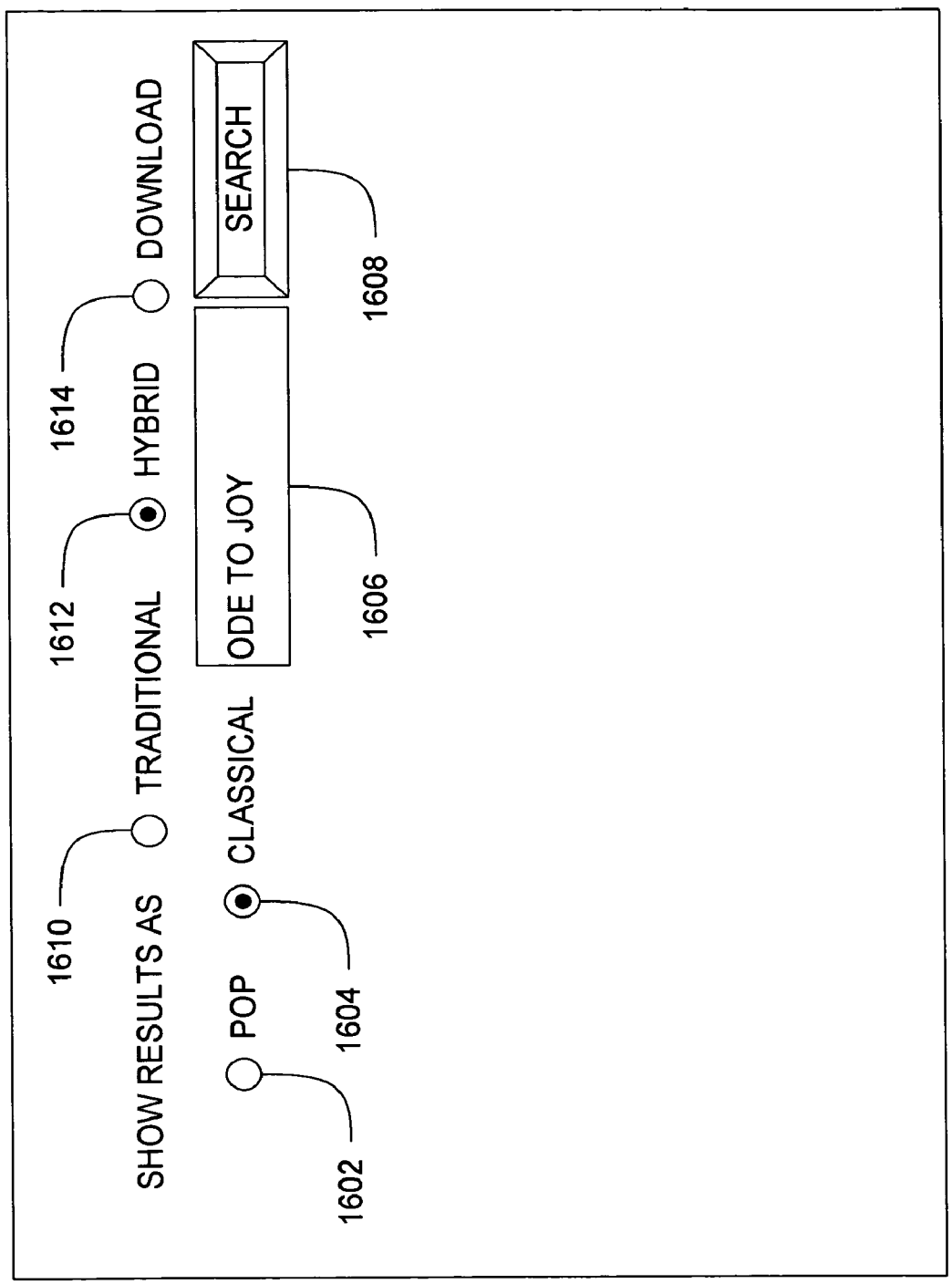
FIG. 16 is a block diagram of a client graphical user interface to receive search information from a user, according to an embodiment.

FIG. 16 is a block diagram of a client graphical user interface (GUI) 1600 to receive search information from a user, according to an embodiment.

In some embodiments, the search information includes an indication of a database to be searched. In the example of GUI 1600, the indications of database to be searched include a "pop" (e.g. popular) music database 1602 and a "classical" music database 1604. The radio button for classical 1604 is selected as indicated by the darkened radio button in 1604.

The search information in GUI 1600 also includes a text entry field 1606 to receive a search phrase, such as search phrase 702 in FIG. 7. In the example of GUI 1600, "Ode to Joy" is entered in the text entry field 1606. One example of the search phrase is the whole/part search information 102 in FIG. 1.

In some embodiments, the search information in GUI 1600 further includes a search button 1608 to be selected by the user when all information in the GUI has been specified to the satisfaction of the user.

In some embodiments, the search information in GUI 1600 yet includes an indication of mutually exclusive selections for the distribution medium through which music items are available. In the example of GUI 1600, the distribution mediums that the user can select from include "traditional" 1610 physical retail store, a "hybrid" 1612 of "traditional" and "download" mediums, and "download" 1614 electronic means. In the example of GUI 1600, a "hybrid" 1612 distribution system is selected as indicated by the darkened radio button 1612.

GUI 1600 is a suitable visual presentation to methods 200 and 1000. GUI 1600 receives search information from a user in preparation to use by server methods 300, 500, 600, 700, 800, 900 and/or 1000. In some embodiments, GUI 1600 operates a browser, such as browsers 1514 and 1518 in FIG. 15.

Figure 17:
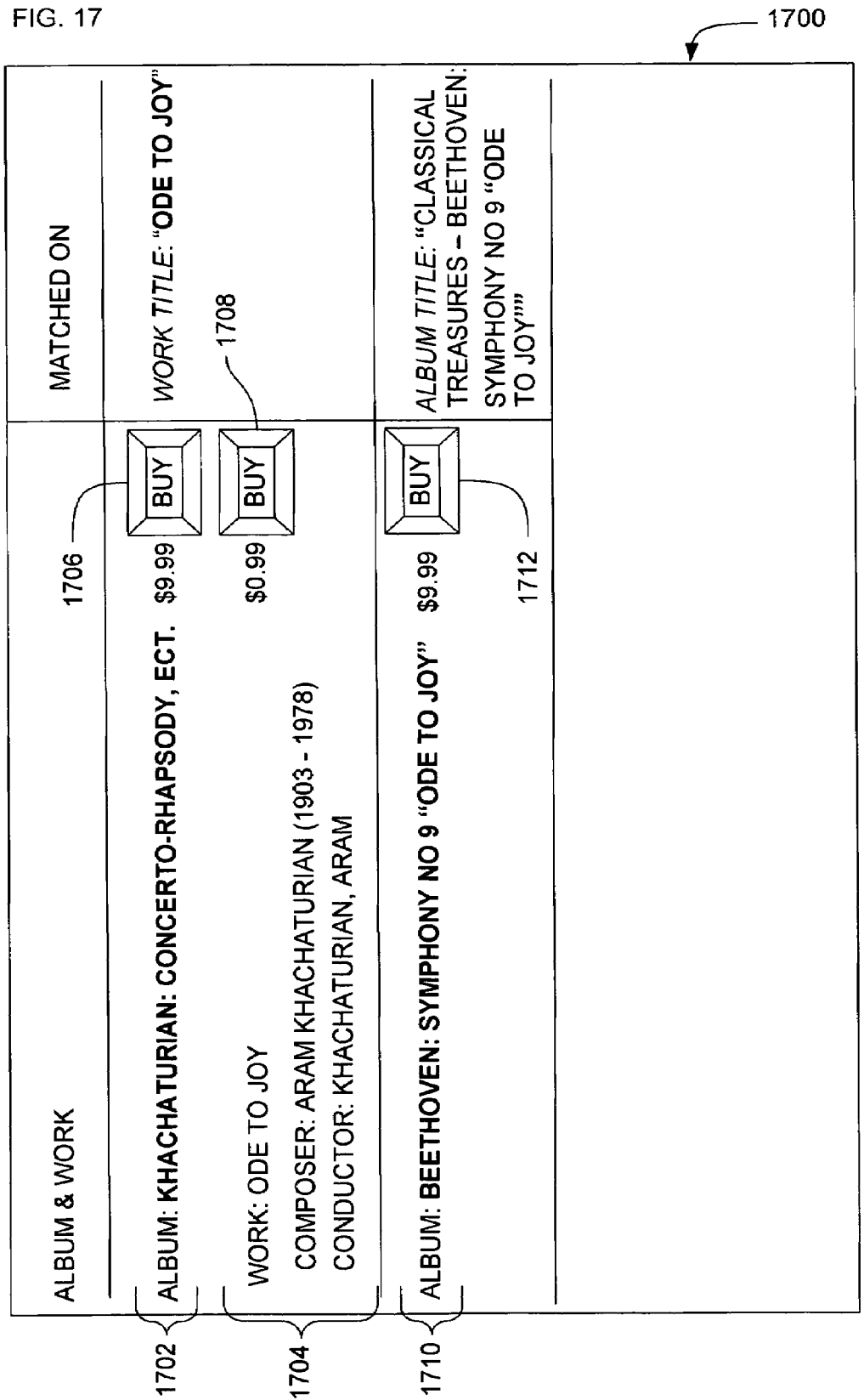
FIG. 17 is a block diagram of a client graphical user interface to receive search information from a user, according to an embodiment.

FIG. 17 is a block diagram of a client graphical user interface (GUI) 1700 to display search results, according to an embodiment. GUI 1700 is an example of displayed results from a search for a search phrase "ODE TO JOY" in a "classical" music database of "hybrid" of both "traditional" and "download" items, such as shown in FIG. 16.

GUI 1700 includes an entry for a whole, (e.g. product) named "Album: Khachaturian: Concerto-Rhapsody, Ect." 1702 that includes one part (e.g. sub-product) of the whole 1702 named "Work: Ode to Joy" 1704. Both the whole 1702 and the part 1704 are purchasable and are associated with GUI buttons 1706 and 1708, respectively, that allow a user to purchase the items.

GUI 1700 also includes another whole 1710 named "Album: Beethoven: Symphony No 9 "Ode to Joy" that is purchasable and associated with GUI button 1712 that allows a user to purchase the item.

Figure 18:
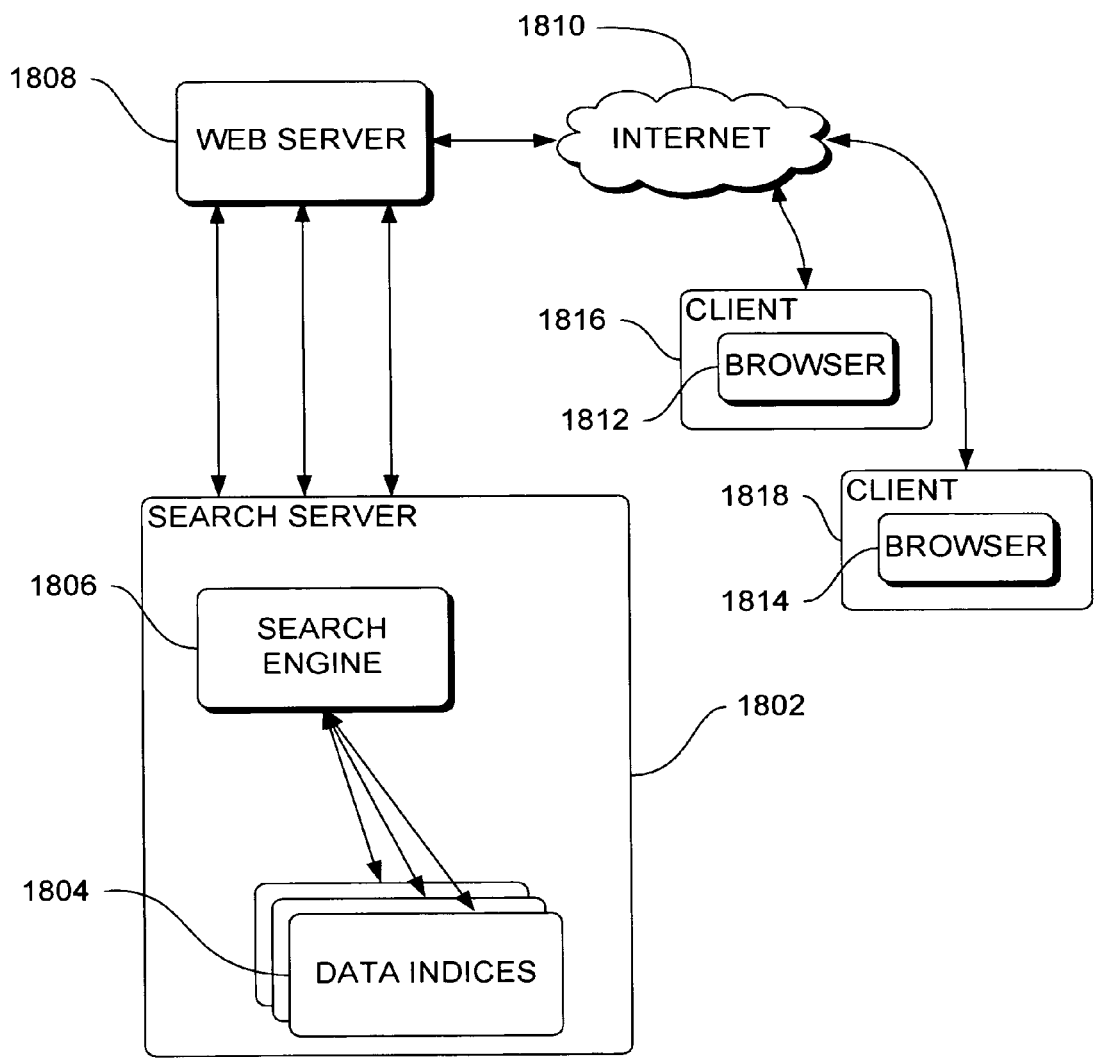
FIG. 18 is a block diagram of a wide-area client-server system according to an embodiment.

FIG. 18 is a block diagram of a wide-area client-server system 1800, according to an embodiment. The wide-area client-server system 1800 includes one or more search servers 1802, that in turn includes data indices 1804. Embodiments of the search server 1802 include system 100 that perform methods 300, 500, 600, 700, 800, 900 and/or 1000. The data indices 1804 include the attribute data set created in action 1034 in FIG. 10, the product data set created in action 1036, the primary index created in action 1038, the product index created in action 1040 and/or the refine-by index created in action 1042.

A search engine 1806 accesses the data indices 1804 and retrieves product/sub-product information. The search engine 1806 is one example of the search engine 106 in FIG. 1.

In some embodiments, a web server 1808 serves web pages using information provided by the search server 1802, via the hyper text transfer protocol (HTTP) protocol. The web server 1808 may be a computer or a software program operating on a computer that is operable as a daemon serving web documents. The web pages are served through the Internet 1810 to web browsers 1812 and 1814 operable on clients 1816 and 1818, respectively.

Figure 19:
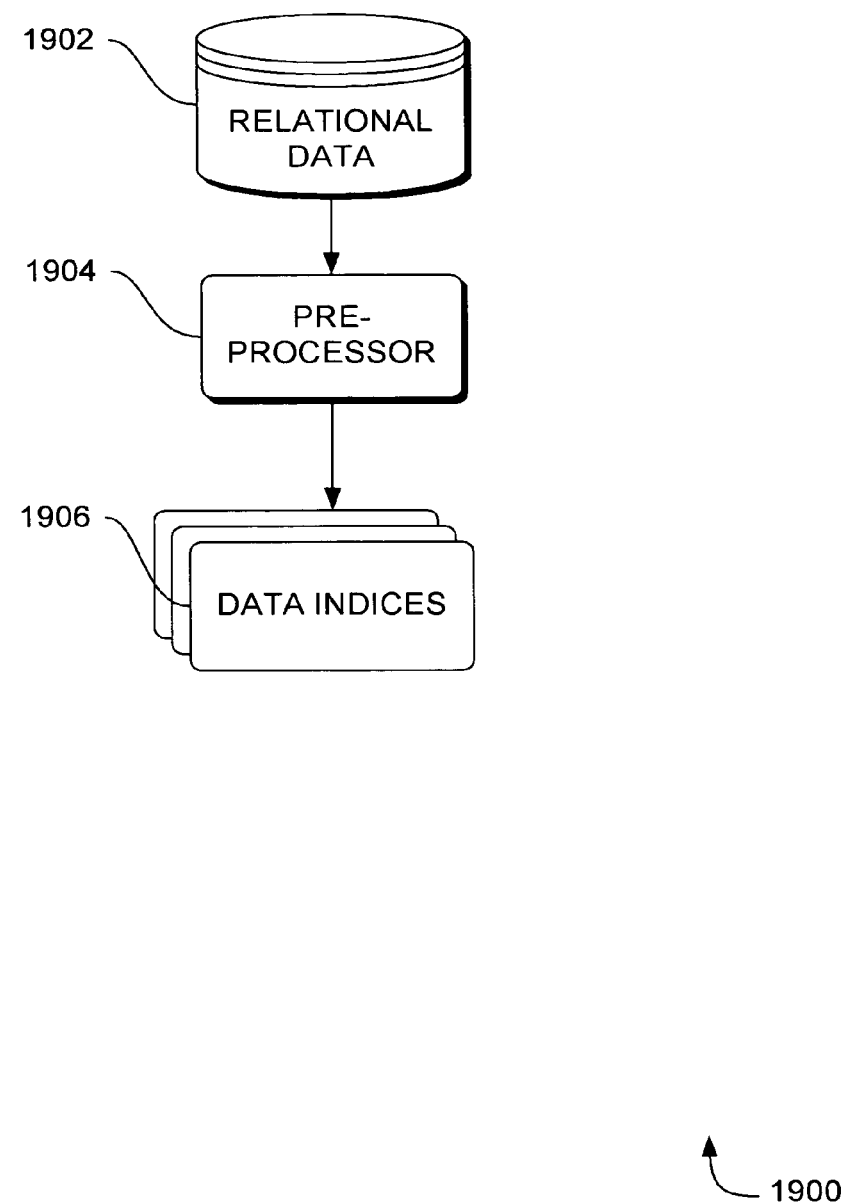
FIG. 19 is a block diagram of a system for preparing data indices according to an embodiment.

FIG. 19 is a block diagram of a system for preparing the data indices 1900, according to an embodiment. In one embodiment, system 1900 performs method 1000 and/or method 1000 of transforming and indexing data for used by a search engine to achieve a product/sub-product search.

System 1900 includes relational data 1902 that includes product and sub-product data. The product and sub-product data is retrieved by a pre-processor 1904. The pre-processor 1904 transforms the product and sub-product data for suitable use in data indices 1906. In one embodiment, preprocessor 1904 performs method 1000 and/or 1000 to transform and index data stored in the relational database 1902 so that the data can be used by a search engine, such as search engine 1806, to achieve a product/sub-product search in accordance with methods 100, 300, 500, 600, 700, 800, 900, and/or 1000. The pre-processor 1904 operates when additional data becomes available in the Relational Database 1902.

Figure 20:
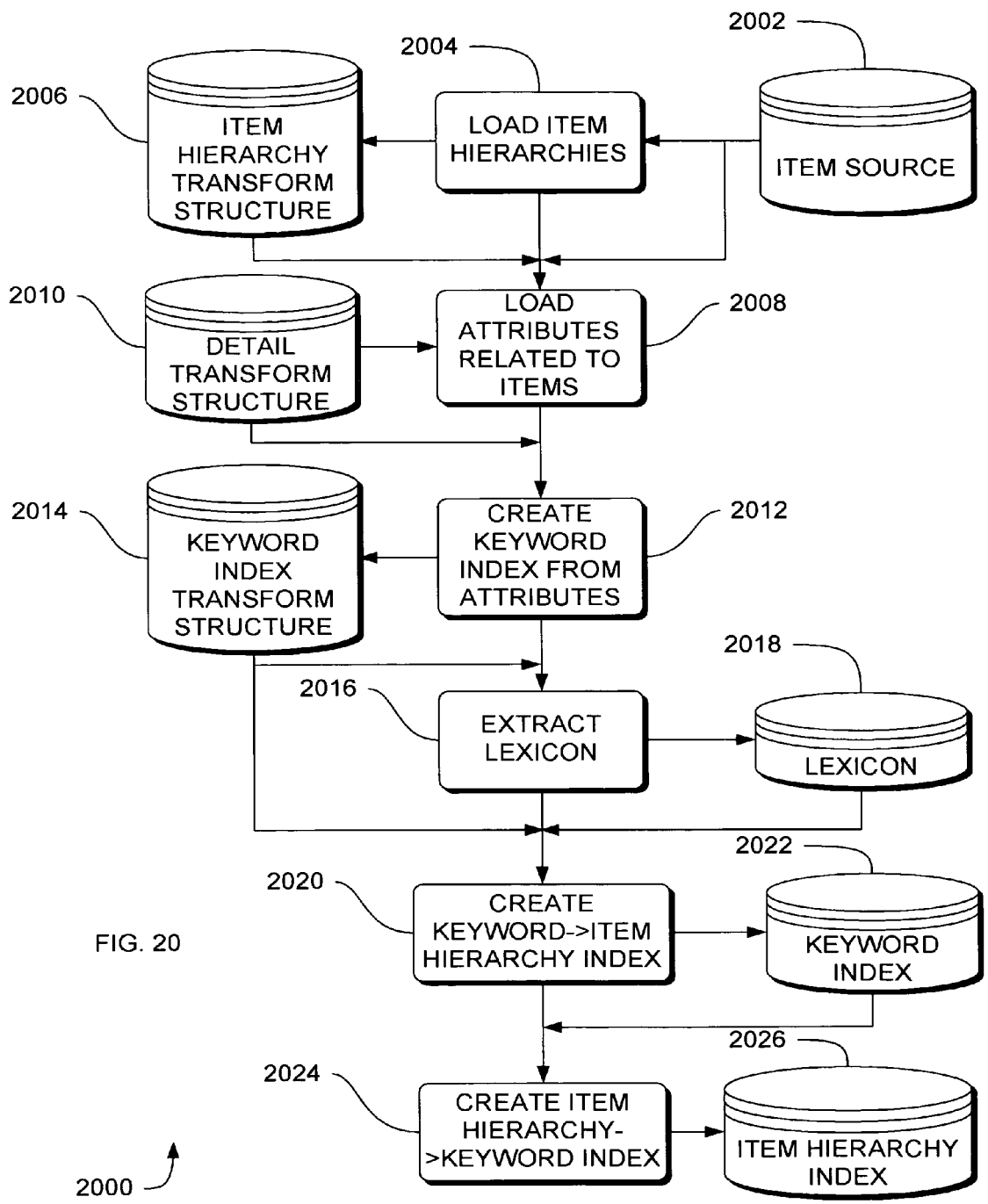
FIG. 20 is a block diagram of a system for preparing data indices according to an embodiment.

FIG. 20 is a block diagram of a system for preparing the data indices 2000, according to an embodiment. In system 2000, item source data 2002 is transmitted to a process 2004 that loads item hierarchies into an item hierarchy transform structure 2006. The item source data 2002 can be structured in a number of conventional formats, such as a relational database, a flat file or an extended markup language (XML) file. Whole/part relationships in the item source data 2002 remains intact in the item hierarchy transform structure 2006.

The item source data 2002 and item hierarchy data 2006 are transmitted to a process 2008 that load attributes related to items into a detail transform structure 2010.

The attributes 2010 are transmitted to a process 2012 that creates keyword index transform structure 2014.

The attributes 2016 and keyword index data 2014 are transmitted to a process 2016 that extracts lexicon data 2018.

The attributes 2016, keyword index data 2014 and lexicon data 2018 are transmitted to a process 2020 that creates a keyword->item hierarchy index 2022.

The keyword->item hierarchy index data 2022 is transmitted to a process 2024 that creates an item hierarchy->keyword index 2026.

In some embodiments, the lexicon 2018, the keyword index 2022 and the item hierarchy index 2026 are accessed by a search engine, such as search engine 106 in FIG. 1 and 1806 in FIG. 18.

The components of 1100-2000 can be embodied as computer hardware circuitry or as a computer-readable program, or a combination of both. In another embodiment, systems 1100-2000 are implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 2102 in FIG. 21, or on at least as many computers as there are components. Furthermore, the search engine can be implemented within a standard relational database Hardware and Operating Environment FIG. 21 is a block diagram of the hardware and operating environment 2100 in which different embodiments can be practiced. The description of FIG. 21 provides an overview of computer hardware and a suitable computing environment in conjunction with which some embodiments can be implemented. Embodiments are described in terms of a computer performing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 2102 includes a processor 2104, commercially available from Intel, Motorola, Cyrix and others. Computer 2102 also includes random-access memory (RAM) 2106, read-only memory (ROM) 2108, and one or more mass storage devices 2110, and a system bus 2112, that operatively couples various system components to the processing-unit 2104. The memory 2106, 2108, and mass storage devices, 2110, are types of computer-accessible media. Mass storage devices 2110 are more specifically types of nonvolatile computer-accessible media and can include one or more hard disk drives, floppy disk drives, optical disk drives, and tape cartridge drives. The processor 2104 executes computer programs stored on the computer-accessible media.

Computer 2102 can be communicatively connected to the Internet 2114 via a communication device 2116. Internet 2114 connectivity is well known within the art. In one embodiment, a communication device 2116 is a modem that responds to communication drivers to connect to the Internet via what is known in the art as a "dial-up connection." In another embodiment, a communication device 2116 is an Ethernet® or similar hardware network card connected to a local-area network (LAN) that itself is connected to the Internet via what is known in the art as a "direct connection" (e.g., T1 line, etc.).

A user enters commands and information into the computer 2102 through input devices such as a keyboard 2118 or a pointing device 2120. The keyboard 2118 permits entry of textual information into computer 2102, as known within the art, and embodiments are not limited to any particular type of keyboard. Pointing device 2120 permits the control of the screen pointer provided by a graphical user interface (GUI) of operating systems such as versions of Microsoft Windows®. Embodiments are not limited to any particular pointing device 2120. Such pointing devices include mice, touch pads, trackballs, remote controls and point sticks. Other input devices (not shown) can include a microphone, joystick, game pad, satellite dish, scanner, or the like.

In some embodiments, computer 2102 is operatively coupled to a display device 2122. Display device 2122 is connected to the system bus 2112. Display device 2122 permits the display of information, including computer, video and other information, for viewing by a user of the computer. Embodiments are not limited to any particular display device 2122. Such display devices include cathode ray tube (CRT) displays (monitors), as well as flat panel displays such as liquid crystal displays (LCD's). In addition to a monitor, computers typically include other peripheral input/output devices such as printers (not shown). Speakers 2124 and 2126 provide audio output of signals. Speakers 2124 and 2126 are also connected to the system bus 2112.

Computer 2102 also includes an operating system (not shown) that is stored on the computer-accessible media RAM 2106, ROM 2108, and mass storage device 2110, and is and executed by the processor 2104. Examples of operating systems include Microsoft Windows®, Apple MacOS®, Linux®, UNIX®. Examples are not limited to any particular operating system, however, and the construction and use of such operating systems are well known within the art.

Embodiments of computer 2102 are not limited to any type of computer 2102. In varying embodiments, computer 2102 comprises a PC-compatible computer, a MacOS®-compatible computer, a Linux®-compatible computer, or a UNIX®-compatible computer. The construction and operation of such computers are well known within the art.

Computer 2102 can be operated using at least one operating system to provide a graphical user interface (GUI) including a user-controllable pointer. Computer 2102 can have at least one web browser application program executing within at least one operating system, to permit users of computer 2102 to access intranet or Internet world-wide-web pages as addressed by Universal Resource Locator (URL) addresses. Examples of browser application programs include Netscape Navigator® and Microsoft Internet Explorer®.

The computer 2102 can operate in a networked environment using logical connections to one or more remote computers, such as remote computer 2128. These logical connections are achieved by a communication device coupled to, or a part of, the computer 2102. Embodiments are not limited to a particular type of communications device. The remote computer 2128 can be another computer, a server, a router, a network PC, a client, a peer device or other common network node. The logical connections depicted in FIG. 21 include a local-area network (LAN) 2130 and a wide-area network (WAN) 2132. Such networking environments are commonplace in offices, enterprise-wide computer networks, intranets and the Internet.

When used in a LAN-networking environment, the computer 2102 and remote computer 2128 are connected to the local network 2130 through network interfaces or adapters 2134, which is one type of communications device 2116. Remote computer 2128 also includes a network device 2136. When used in a conventional WAN-networking environment, the computer 2102 and remote computer 2128 communicate with a WAN 2132 through modems (not shown). The modem, which can be internal or external, is connected to the system bus 2112. In a networked environment, program modules depicted relative to the computer 2102, or portions thereof, can be stored in the remote computer 2128.

Computer 2102 also includes power supply 2138. Each power supply can be a battery.

In some embodiments of the methods 100, 500, 600, 700, 800, 900 and/or 1000, each method provides operation of two sub-domains of Music, Classical Music and Popular Music, within a single instance of the engine or in multiple instances of the engine. The search engine itself is implemented as a server, which can service multiple concurrent requests simultaneously. In some implementations, the search engine is coupled with one or more web servers to enable users to access the search over the Internet using the HTTP protocol. Embodiments are suitable for implementation by online retailers and other e-commerce participants.

All aspects of systems, methods, data structures and apparatus described herein can be implemented to support wholes and portions and products and sub-products from any industry, including but not limited to the following: Entertainment (including but not limited to Music, Movie and Video, Books, Toys, Video Games) Electronics, Computers and computer accessories, (including but not limited to Software, Printers, Ink & Toner) Fax Machines, Home Entertainment (including but not limited to televisions, DVD Players, PVRs, Speakers, Camcorders, Digital Cameras, Portable Electronics, MP3 Payers, Portable Audio, Portable Video, Batteries), Musical Instruments, Recording Equipment, Appliances (including but not limited to Vacuum Cleaner, Refrigerators, Freezers, Washers & Dryers, Bread & Pasta Makers, Food Processors, Coffee Makers, Grills/Toasters) Cookware, Cutlery, Organization Helpers, Furniture, Bedding, Bath, Personal Care (including but not limited to Shavers, Dental Care, Scales, Massagers), Sewing Machines, Air Conditioners, Heaters, Air Purifiers, Humidifiers, Hot Tubs, Grilling, Lawn Mowers, Automotive (including Cars, Tires, Stereos, auto parts), Sports and sporting goods (including but not limited to Tennis, Golf, Basketball, Exercise, Table Games, Biking, Camping, Hunting, Football, Soccer, Fishing, Baseball), Baby and Baby care, Photo Albums, Aerospace and Defense (including but not limited to Airplanes and their parts including but not limited to engines, seats, and wiring), apparel and accessories (including but not limited to women's, men's, and children's shirts, shorts, pants, jackets, socks, shoes, dresses, perfume, ties, belts, jewelry, hair care products), tools (including but not limited to hammers, drills, screwdrivers, wrenches), food and beverage (including but not limited to groceries, soda, meat and poultry, cereal, etc.), drugs (including but not limited to prescription drugs, over the counter drugs like cough suppressant, aspirin, etc.), communication equipment (including but not limited to phones, networking, answering machines, speaker phones), consumer financial services (including but not limited to credit cards, banking, stock and bond investing), footwear (including but not limited to men's, women's and children's shoes, sneakers, boots), travel (including but not limited to airlines, hotels, car rental, vacation packages), insurance (including but not limited to life, health, disability, travel, wedding), services (including but not limited to consulting, medical and non-medical treatment, etc.), and education and education material.

Conclusion

A whole/part search system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database and communication environments and alternate technologies which provide the same functionality as described herein.

We claim:

1. A computer-accessible medium having executable instructions to determine relevancy of search results, the executable instructions configured to direct a processor to perform:
   receiving into a memory information describing a search intention and wherein the intention of the search is not derived from a search phrase;
   receiving into the memory a rule set describing customization of effects of search matches within different attribute types at different levels of the search data on an overall inclusion in a result set, the rule set describing attribute types and weights that are specific to a domain or a sub-domain of the search data and a relative ordering of attribute importance based on the intention of the search; and
   determining relevancy of results of a search, in reference to the rule set selected from the group consisting of a whole-biased rule set that favors wholes as a primary ordering criteria and a parts-biased rule set that favors parts as a primary ordering criteria,
   wherein a source of the search intention is not a user and is an environment of which the user has no control,
   wherein the search intention further comprises state information that is defined by an organization that sponsors the computer-accessible medium.

2. The computer-accessible medium of claim 1, wherein the search intention further comprises state information that is defined by an organization that sponsors the computer-accessible medium.

3. The computer-accessible medium of claim 1, wherein the executable instructions configured to direct the processor to determine relevancy further comprise executable instructions configured to direct the processor to perform:
   determining relevancy of the search results, in reference to a whole-biased rule set that describes:
     at least one weight corresponding to each attribute type, wherein a greater weight is associated with an attribute type at a whole level than to attribute types at a non-whole level.

4. The computer-accessible medium of claim 1, wherein the executable instructions configured to direct the processor to determine relevancy further comprise executable instructions configured to direct the processor to perform:
   determining relevancy of results of the search, in reference to a parts-biased rule set that favors parts as a primary ordering criteria.

5. The computer-accessible medium of claim 4, wherein the executable instructions configured to direct the processor to determine relevancy further comprise executable instructions configured to direct the processor to perform:
   determining relevancy of results of the search, in reference to a parts-biased rule set that describes:
     primary ordering criteria that favors parts; and
     at least one weight corresponding to each attribute type, wherein a greater weight is associated with an attribute type at a part level than to attribute types at a non-part level.

6. The computer-accessible medium of claim 1, wherein the executable instructions configured to direct the processor to determine relevancy further comprise executable instructions configured to direct the processor to perform:
   determining relevancy of results of the search, in reference to a parts-biased rule set that serves to customize how matches within different attribute types at different whole levels and different part levels affect an overall inclusion of parts in the search results.

7. A computer implemented method to determine relevancy of search results, the method comprises:
   receiving into a memory information describing an intention of the search;
   receiving into the memory a rule set describing customization of effects of search matches within different attribute types at different levels of the search data on an overall inclusion in a result set, the rule set describing attribute types and weights that are specific to a domain or a sub-domain of the search data and the relative ordering of attribute importance based on the intention of the search;
   determining relevancy of results of a search, in reference to the rule set selected from the group consisting of a whole-biased rule set that favors wholes as a primary ordering criteria and a parts-biased rule set that favors parts as a primary ordering criteria; and
   generating in the memory relevancy of results of the search in reference to the intention of the search and the rule set,
   wherein a source of the intention of the search is an environment of which a user has no control,
   wherein the search intention further comprises state information that is defined by an organization that sponsors the computer-accessible medium.

8. The method of claim 7, wherein the determining relevancy further comprises:
   generating relevancy of the search results, in reference to a whole-biased rule set that favors wholes as a primary ordering criteria.

9. The method of claim 8, wherein the determining relevancy further comprises:
   generating relevancy of the search results, in reference to a whole-biased rule set that describes:
     primary ordering criteria that favors top-level wholes; and
     at least one weight corresponding to each attribute type, wherein a greater weight is associated with an attribute type at a whole level than to attribute types at a non-whole level.

10. The method of claim 7, wherein the determining relevancy further comprises:
    generating relevancy of the search results, in reference to a parts-biased rule set that favors parts as a primary ordering criteria.

11. The method of claim 9, wherein the determining relevancy further comprises:
    generating relevancy of the search results, in reference to a parts-biased rule set that describes:
      primary ordering criteria that favors parts; and
      at least one weight corresponding to each attribute type, wherein a greater weight is associated with an attribute type at a part level than to attribute types at a non-part level.

12. An apparatus comprising:
    a processor;
    a memory coupled with the processor;
    a receiver configured to receive into the memory information describing an intention of a search, wherein the intention of the search is not derived from a search phrase;
    a selector of a rule set into the memory describing customization of effects of search matches within different attribute types at different levels of the search data on an overall inclusion in a result set, the rule set describing attribute types and weights that are specific to a domain or a sub-domain of the search data and the relative ordering of attribute importance based on the intention of the search; and a determiner of a relevancy of results of the search into the memory in reference to an intention of the search and the rule set selected from the group consisting of a whole-biased rule set that favors wholes as a primary ordering criteria and a parts-biased rule set that favors parts as a primary ordering criteria, wherein a source of the intention of the search is an environment of which a user has no control, wherein the intention of the search further comprises state information that is defined by an organization that sponsors the computer-accessible medium.

13. The apparatus of claim 12, wherein the determiner of relevancy further comprises:
  a determiner of a relevancy of results of the search, in reference to a product-biased rule set that describes:
    at least one weight corresponding to each attribute type, wherein a greater weight is associated with an attribute type at a product level than to attribute types at a non-product level.

14. The apparatus of claim 12, further comprising:
  an orderer of a results set of the search based on the relevancy.

15. The apparatus of claim 12, further comprising:
  a calculator of a relevancy score from the determined relevancy.

* * * * *